United States Patent
Piao et al.

(10) Patent No.: US 6,619,064 B1
(45) Date of Patent: Sep. 16, 2003

(54) AIR CONDITIONING SYSTEM

(75) Inventors: Chun-cheng Piao, Osaka (JP); Ryuichi Sakamoto, Osaka (JP); Yuji Watanabe, Osaka (JP); Manabu Yoshimi, Osaka (JP); Kazuo Yonemoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/914,769

(22) PCT Filed: Mar. 1, 2000

(86) PCT No.: PCT/JP00/01210
§ 371 (c)(1),
(2), (4) Date: Sep. 5, 2001

(87) PCT Pub. No.: WO00/53982
PCT Pub. Date: Sep. 14, 2000

(30) Foreign Application Priority Data

May 3, 2000 (JP) ............................................. 11/58019

(51) Int. Cl.[7] ............................. F25D 9/00; F25D 23/00
(52) U.S. Cl. ................................ 62/271; 62/402; 62/94
(58) Field of Search ........................ 62/271, 94, 238.3, 62/401, 402, 86, 87, 324.1, 324.2, 324.5

(56) References Cited

U.S. PATENT DOCUMENTS

| | | |
|---|---|---|
| 3,844,737 A | 10/1974 | Macriss et al. |
| 4,665,715 A | 5/1987 | Signoret |
| 5,323,624 A | 6/1994 | Schwalm |
| 5,512,083 A | 4/1996 | Dunne |
| 5,555,745 A * | 9/1996 | Agahi et al. ................ 62/401 |
| 5,642,629 A * | 7/1997 | Ohman ........................ 62/401 |
| 5,702,508 A | 12/1997 | Moratalla |
| 5,826,434 A | 10/1998 | Belding et al. |

FOREIGN PATENT DOCUMENTS

| | | |
|---|---|---|
| JP | 62-223573 | 10/1987 |
| JP | 2-187542 | 7/1990 |
| JP | 03-079977 | 4/1991 |
| JP | 5-305215 | 11/1993 |
| JP | 6-213521 | 8/1994 |
| JP | 8-178350 | 7/1996 |
| JP | 8-318731 | 12/1996 |
| WO | WO 96/23188 | 8/1996 |

OTHER PUBLICATIONS

English Translation of the International Preliminary Examination Report issued for the PCT application (PCT/JP00/01210).

European Search Report Dated Feb. 22, 2002.

* cited by examiner

Primary Examiner—Chen Wen Jiang
(74) Attorney, Agent, or Firm—Nixon Peabody LLP; Donald R. Studebaker

(57) ABSTRACT

A first channel (20) is formed by sequentially connecting a compressor (21), a heat exchanger (30) and an expander (22). In the first channel (20), an outside air is taken through a first inlet duct (23) and supplied to a room through a first outlet duct (24). A second channel (40) is formed by connecting both ends of the heat exchanger (30) to ducts (43, 44). In the second channel (40), a room air is taken through the second inlet duct (43) and discharged to outdoors through the second outlet duct (44). A moisture absorbing section (62) of a dehumidifying mechanism (60) is provided in the first inlet duct (23), while a moisture releasing section (63) thereof is provided in the second inlet duct (43). A rotor member (61) including a solid adsorbent rotatively moves between the moisture absorbing section (62) and the moisture releasing section (63). Air dehumidified in the moisture absorbing section (62) is supplied to the compressor (21).

19 Claims, 11 Drawing Sheets

AIR CONDITIONING SYSTEM

TECHNICAL FIELD

This invention relates to an air conditioning system using an air cycle.

BACKGROUND ART

There is conventionally known a cooling system operating through an air cycle, as disclosed in Japanese Unexamined Patent Publication No. 62-102061. A cooling system of this kind includes a compressor, a heat exchanger and an expander, and is configured to suck an air into the compressor for compression, cool the compressed air in the heat exchanger and then expand it in the expander thereby obtaining a low-temperature air.

Meanwhile, in the cooing system disclosed in the above publication, a vapor isolating device using a vapor isolating membrane is provided between the heat exchanger and the expander to isolate moisture from the compressed air being supplied to the expander. Once expanded in the expander, the air is reduced in temperature so that dropwise condensation may occur in the air. Therefore, the air as a working fluid for the air cycle is needed to undergo dehumidification prior to entry into the expander. For this reason, in the above cooling system, the vapor isolating device is provided in place to dehumidify the compressed air.

PROBLEMS TO BE SOLVED

However, since the cooling system as described above accomplishes dehumidification by using the vapor isolating membrane, the air as a working fluid for the air cycle can only be dehumidified between the compressor and the expander. Specifically, when the vapor isolating membrane is used, moisture in the air permeates the vapor isolating membrane, i.e., moves from the air on one side of the vapor isolating membrane to that on the other side. In this case, the moisture in the air permeates the vapor isolating membrane with a difference between vapor partial pressures in the airs on both sides of the isolating membrane. Accordingly, the air from which moisture moves must always be held at a higher vapor partial pressure than that to which moisture moves, and therefore there has been nothing for means for dehumidification but to be provided in a place where the vapor partial pressure of the air from which moisture moves will be high, i.e., between the compressor and the expander.

It is now to be noted that any component for dehumidifying the air, including one using the vapor isolating membrane, should be rather large in size. This is because a certain degree or more of contact area with the air to be dehumidified must be ensured. Therefore, there arises the problem that limitation of placement of such a relatively large component would incur degradation in design flexibility of the overall system.

In addition, if a seal between the compressor and the expander is insufficient, this causes leakage of the compressed air so that the compressor input may be lost, resulting in significantly decreased efficiency. Therefore, as the number of components provided between the compressor and the expander increases, the number of points at which leakage of the compressed air may occur, such as connecting parts, also increases. There arises the problem that attempts to fully form the seal would incur complicated construction.

The present invention has been made in view of such problems and therefore aims at enhancing the design flexibility and providing simplified construction while keeping high efficiency.

DISCLOSURE OF INVENTION

The present invention provides for carrying out dehumidification of the air as a working fluid for the air cycle with the use of a humidity medium for absorbing and releasing moisture through contact with the air prior to supply of the air to the compressor.

More specifically, a first solution taken in the present invention is directed to an air conditioning system for effecting air conditioning in an air cycle comprising a compressor (21), a heat exchanger (30) and an expander (22). Further, provided in this system is dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air.

In a second solution taken in the present invention, based on the first solution, the heat exchanger (30) is arranged to cool the compressed primary air through heat exchange with the secondary air, and the dehumidifying means (60) is arranged to release moisture in the humidity medium to the secondary air coming from the heat exchanger (30).

In a third solution taken in the present invention, based on the first or second solution, the humidity medium of the dehumidifying means (60) is provided with a solid adsorbent for adsorbing moisture.

In a fourth solution taken in the present invention, based on the third solution, the humidity medium of the dehumidifying means (60) is formed of a rotor member (61) that is formed in the shape of a disc to allow air passage in a direction of its thickness and provides contact of the passing air with the solid adsorbent, and the dehumidifying means (60) comprises a moisture absorbing section (62) where the rotor member (61) absorbs moisture in the primary air through contact with the primary air, a moisture releasing section (63) where the rotor member (61) releases moisture therein to the secondary air through contact with the secondary air, and a drive mechanism for rotatively driving the rotor member (61) to allow the rotor member (61) to move between the moisture absorbing section (62) and the moisture releasing section (63).

In a fifth solution taken in the present invention, based on the third solution, the solid adsorbent is made of porous inorganic oxide.

In a sixth solution taken in the present invention, based on the first or second solution, the humidity medium of the dehumidifying means (60) comprises a liquid absorbent for absorbing moisture.

In a seventh solution taken in the present invention, based on the first solution, the humidity medium of the dehumidifying means (60) comprises a liquid absorbent for absorbing moisture, and the dehumidifying means (60) is arranged so that the liquid absorbent is heated by the primary air coming from the compressor (21) to release moisture having absorbed from the primary air to the secondary air.

In an eighth solution taken in the present invention, based on the sixth or seventh solution, the dehumidifying means (60) includes a moisture-permeable, hydrophobic porous membrane and is arranged to contact the liquid absorbent with the primary air through the hydrophobic porous membrane.

In a ninth solution taken in the present invention, based on the sixth or seventh solution, the liquid absorbent is made of a water solution of hydrophilic organic compound.

In a tenth solution taken in the present invention, based on the sixth or seventh solution, the liquid absorbent is made of a water solution of metallic halide.

In an eleventh solution taken in the present invention, based on the sixth or seventh solution, the dehumidifying means (60) comprises a circulation circuit (64) that includes a moisture absorbing section (65) for contacting the liquid absorbent with the primary air and a moisture releasing section (66) for contacting the liquid absorbent with the secondary air and circulates the liquid absorbent between the moisture absorbing section (65) and the moisture releasing section (66).

In a twelfth solution taken in the present invention, based on the second solution, cooling of a room is effected by supplying the primary air expanded in the expander (22) to the room.

In a thirteenth solution taken in the present invention, based on the twelfth solution, the primary air is an outside air taken from outdoors and then supplied to the room through the expander (22), while the secondary air is a room air taken from the room and then discharged to outdoors through the dehumidifying means (60).

In a fourteenth solution taken in the present invention, based on the twelfth solution, the primary air is an outside air taken from outdoors and then supplied to the room through the expander (22), while the secondary air is an outside air taken from outdoors and then discharged to outdoors through the dehumidifying means (60).

In a fifteenth solution taken in the present invention, based on the twelfth solution, the primary air is a room air taken from the room and then supplied to the room through the expander (22), while the secondary air is a room air taken from the room and then discharged to outdoors through the dehumidifying means (60).

In a sixteenth solution taken in the present invention, based on the twelfth solution, the primary air is a room air taken from the room and then supplied to the room through the expander (22), while the secondary air is an outside air taken from outdoors and then discharged to outdoors through the dehumidifying means (60).

In a seventeenth solution taken in the present invention, based on the twelfth solution, the primary air is a mixed air of a room air taken from the room and an outside air taken from outdoors and is supplied to the room through the expander (22), while the secondary air is a room air taken from the room and then discharged to outdoors through the dehumidifying means (60).

In an eighteenth solution taken in the present invention, based on the twelfth solution, the primary air is a mixed air of a room air taken from the room and an outside air taken from outdoors and is supplied to the room through the expander (22), while the secondary air is an outside air taken from outdoors and then discharged to outdoors through the dehumidifying means (60).

In a nineteenth solution taken in the present invention, based on the twelfth solution, the primary air is a mixed air of a room air taken from the room and an outside air taken from outdoors and is supplied to the room through the expander (22), while the secondary air is a mixed air of a room air taken from the room and an outside air taken from outdoors and is discharged to outdoors through the dehumidifying means (60).

A twentieth solution taken in the present invention is, based on the twelfth solution, provided with preheating means (33) for heating the primary air dehumidified by the dehumidifying means (60) through heat exchange with the primary air compressed by the compressor (21) and then supplying the primary air to the compressor (21).

A twenty-first solution taken in the present invention is, based on the twelfth solution, provided with preheating means (33) for heating the primary air dehumidified by the dehumidifying means (60) through heat exchange with part of the primary air compressed by the compressor (21) and then supplying the primary air to the compressor (21).

A twenty-second solution taken in the present invention is, based on any one of the twelfth to twenty-first solutions, provided with moisture supplying means (41) for supplying moisture to the secondary air not yet supplied to the heat exchanger (30) in order to humidify and cool the secondary air.

A twenty-third solution taken in the present invention is, based on any one of the twelfth to twenty-first solutions, provided with moisture supplying means (42) for supplying moisture to the secondary air in the heat exchanger (30) in order to use latent heat of evaporation of water to cool the primary air in the heat exchanger (30).

In a twenty-fourth solution taken in the present invention, based on the twenty-second or twenty-third solution, the moisture supplying means (41, 42) is arranged to supply moisture to the secondary air through a permeable membrane capable of permeating moisture.

In a twenty-fifth solution taken in the present invention, based on the second solution, heating of a room is effected by supplying the secondary air heated through heat exchange with the primary air in the heat exchanger (30) to the room.

In a twenty-sixth solution taken in the present invention, based on the twenty-fifth solution, the primary air is a room air taken from the room and then discharged to outdoors through the expander (22), while the secondary air is an outside air taken from outdoors and then supplied to the room through the dehumidifying means (60).

In a twenty-seventh solution taken in the present invention, based on the twenty-fifth solution, the primary air is an outside air taken from outdoors and then discharged to outdoors through the expander (22), while the secondary air is an outside air taken from outdoors and then supplied to the room through the dehumidifying means (60).

In a twenty-eighth solution taken in the present invention, based on the twenty-fifth solution, the primary air is a room air taken from the room and then discharged to outdoors through the expander (22), while the secondary air is a room air taken from the room and then supplied to the room through the dehumidifying means (60).

In a twenty-ninth solution taken in the present invention, based on the twenty-fifth solution, the primary air is an outside air taken from outdoors and then discharged to outdoors through the expander (22), while the secondary air is a room air taken from the room and then supplied to the room through the dehumidifying means (60).

In a thirtieth solution taken in the present invention, based on the twenty-fifth solution, the primary air is a room air taken from the room and then discharged to outdoors through the expander (22), while the secondary air is a mixed air of a room air taken from the room and an outside air taken from outdoors and is supplied to the room through the dehumidifying means (60).

In a thirty-first solution taken in the present invention, based on the twenty-fifth solution, the primary air is an outside air taken from outdoors and then discharged to outdoors through the expander (22), while the secondary air is a mixed air of a room air taken from the room and an outside air taken from outdoors and is supplied to the room through the dehumidifying means (60).

In a thirty-second solution taken in the present invention, based on the twenty-fifth solution, the primary air is a mixed air of a room air taken from the room and an outside air taken from outdoors and is discharged to outdoors through the expander (22), while the secondary air is a mixed air of a room air taken from the room and an outside air taken from outdoors and is supplied to the room through the dehumidifying means (60).

A thirty-third solution taken in the present invention is, based on the second solution, provided with selector means (71, 72) for taking in different airs as the primary and secondary airs for each of cooling and heating operations and selecting the primary air from the expander (22) and the secondary air from the dehumidifying means (60) to supply them to the room to thereby allow both the cooling and heating operations.

A thirty-fourth solution taken in the present invention is, based on the thirty-third solution, provided with preheating means (33) for heating the primary air dehumidified by the dehumidifying means (60) through heat exchange with the primary air compressed by the compressor (21) and then supplying the primary air to the compressor (21), and bypassing means (73) for allowing the primary air to bypass the preheating means (33) and to be supplied directly to the compressor (21) during the heating operation.

A thirty-fifth solution taken in the present invention is, based on the thirty-third solution, provided with preheating means (33) for heating the primary air dehumidified by the dehumidifying means (60) through heat exchange with part of the primary air compressed by the compressor (21) and then supplying the primary air to the compressor (21), and bypassing means (73) for allowing the primary air to bypass the preheating means (33) and to be supplied directly to the compressor (21) during the heating operation.

Operations

In the first solution, the primary air is supplied to the compressor (22) and so compressed therein as to reach a high temperature. The high-temperature primary air is cooled in the heat exchanger (30) and then so expanded by the expander (22) as to reach a low temperature. This compressor (21) is supplied with the primary air dehumidified by the dehumidifying means (60). Cooling the room is provided by supplying the low-temperature primary air to the room, while heating the room is provided by using heat release from the primary air in the heat exchanger (30).

The humidity medium of the dehumidifying means (60) absorbs moisture in the primary air and releases the absorbed moisture to the secondary air. In other words, the moisture in the primary air is transferred to the secondary air through the humidity medium. During the time, if the relative humidity of the primary air is high to some extent, the humidity medium absorbs moisture. On the other hand, if the relative humidity of the secondary air is low to some extent, the humidity medium releases moisture. Accordingly, even if the primary and secondary airs have equal vapor partial pressures or equal absolute humidities, a difference in relative humidity between both the airs would cause moisture transfer through the humidity medium.

In the second solution, the primary air from the compressor (21) is cooled through heat exchange with the secondary air and then flows toward the expander (22). On the other hand, the humidity medium of the dehumidifying means (60) releases moisture to the secondary air heated in the heat exchanger (30). In other words, the humidity medium releases moisture to the secondary air elevated in temperature and reduced in relative humidity through heat application as a result of heat exchange with the primary air.

In the third solution, the humidity medium absorbs moisture in such a manner that the moisture is adsorbed on the solid adsorbent. Further, the humidity medium releases moisture in such a manner that the moisture is desorbed from the solid adsorbent.

In the fourth solution, the humidity medium is formed of a disc-shaped rotor member (61). A portion of the rotor member (61) absorbs moisture through contact with the primary air in the moisture absorbing section (62). The rotor member (61) is rotatively driven by the drive mechanism so that the portion of the rotor member (61) which has absorbed moisture moves to the moisture releasing section (63). In the moisture releasing section (63), the rotor member (61) releases the moisture through contact with the secondary air. The rotor member (61) as the humidity medium is thereby regenerated. Thereafter, the portion of the rotor member (61) which has been regenerated moves to the moisture absorbing section (62) again and repeats these actions.

In the fifth solution, the solid adsorbent is made of porous inorganic oxide. It is to be noted that the solid adsorbent may be made of particular inorganic oxide alone or may include the inorganic oxide as a main ingredient.

In the sixth solution, the humidity medium absorbs moisture in such a manner that the moisture is absorbed in the liquid absorbent. Further, the humidity medium releases moisture in such a manner that the moisture is desorbed from the liquid absorbent.

In the seventh solution, the liquid absorbent absorbs moisture from the primary air not yet supplied to the compressor (21). This liquid absorbent is heated up into an easy-to-release condition by the high-temperature primary air compressed by the compressor (21), and then released to the secondary air. This moisture release regenerates the liquid absorbent.

In the eighth solution, the primary air and the liquid absorbent come into indirect contact with each other through the hydrophobic porous membrane interposed therebetween. The moisture in the primary air permeates the hydrophobic porous membrane and is then absorbed in the liquid absorbent, whereby the primary air is dehumidified.

In the ninth solution, the liquid absorbent is made of a water solution of hydrophilic organic compound. Examples of organic compound of this kind include ethylene glycol, glycerin and hydrophilic resin.

In the tenth solution, the liquid absorbent is made of a water solution of metallic halide. Examples of metallic halide of this kind include LiCl, LiBr and $CaCl_2$.

In the eleventh solution, the liquid absorbent absorbs moisture of the primary air in the moisture absorbing section (65), whereby the primary air is dehumidified. This liquid absorbent flows through the circulation circuit (64) to reach the moisture releasing section (66). In the moisture releasing section (66), the liquid absorbent releases moisture to the secondary air and is thereby regenerated. The regenerated liquid absorbent flows through the circulation circuit (64) to reach the moisture absorbing section (65) again, and repeats this circulation.

In the twelfth solution, the primary air expanded in the expander (22) to reach a low temperature is supplied to the room, thereby cooling the room.

In the thirteenth solution, an outside air is supplied as the primary air to the dehumidifying means (60). This outside air is dehumidified by the dehumidifying means (60), supplied to the compressor (21), sequentially flows through the compressor (21), the heat exchanger (30) and the expander (22) to reach a low temperature, and is then supplied to the room. On the other hand, a room air is supplied as the secondary air to the heat exchanger (30). This room air passes through the heat exchanger (30), flows into the dehumidifying means (60), takes moisture from the dehumidifying means (60), and is then discharged to outdoors.

In the fourteenth solution, an outside air is supplied as the primary air to the dehumidifying means (60). This outside air is dehumidified by the dehumidifying means (60), is supplied to the compressor (21), sequentially flows through the compressor (21), the heat exchanger (30) and the expander (22) to reach a low temperature, and is then supplied to the room. On the other hand, another outside air is also supplied as the secondary air to the heat exchanger (30). This outside air passes through the heat exchanger (30), flows into the dehumidifying means (60), takes moisture from the dehumidifying means (60), and is then discharged to outdoors again.

In the fifteenth solution, a room air is supplied as the primary air to the dehumidifying means (60). This room air is dehumidified by the dehumidifying means (60), is supplied to the compressor (21), sequentially flows through the compressor (21), the heat exchanger (30) and the expander (22) to reach a low temperature, and is then supplied to the room again. On the other hand, another room air is also supplied as the secondary air to the heat exchanger (30). This room air passes through the heat exchanger (30), flows into the dehumidifying means (60), takes moisture from the dehumidifying means (60), and is then discharged to outdoors.

In the sixteenth solution, a room air is supplied as the primary air to the dehumidifying means (60). This room air is dehumidified by the dehumidifying means (60), is supplied to the compressor (21), sequentially flows through the compressor (21), the heat exchanger (30) and the expander (22) to reach a low temperature, and is then supplied to the room again. On the other hand, an outside air is supplied as the secondary air to the heat exchanger (30). This outside air passes through the heat exchanger (30), flows into the dehumidifying means (60), takes moisture from the dehumidifying means (60), and is then discharged to outdoors again.

In the seventeenth solution, a mixed air of room and outside airs is supplied as the primary air to the dehumidifying means (60). This mixed air is dehumidified by the dehumidifying means (60), is supplied to the compressor (21), sequentially flows through the compressor (21), the heat exchanger (30) and the expander (22) to reach a low temperature, and is then supplied to the room. On the other hand, a room air is supplied as the secondary air to the heat exchanger (30). This room air passes through the heat exchanger (30), flows into the dehumidifying means (60), takes moisture from the dehumidifying means (60), and is then discharged to outdoors.

In the eighteenth solution, a mixed air of room and outside airs is supplied as the primary air to the dehumidifying means (60). This mixed air is dehumidified by the dehumidifying means (60), is supplied to the compressor (21), sequentially flows through the compressor (21), the eat exchanger (30) and the expander (22) to reach a low temperature, and is then supplied to the room. On the other hand, an outside air is supplied as the secondary air to the heat exchanger (30). This outside air passes through the heat exchanger (30), flows into the dehumidifying means (60), takes moisture from the dehumidifying means (60), and is then discharged to outdoors again.

In the nineteenth solution, a mixed air of room and outside airs is supplied as the primary air to the dehumidifying means (60). This mixed air is dehumidified by the dehumidifying means (60), is supplied to the compressor (21), sequentially flows through the compressor (21), the heat exchanger (30) and the expander (22) to reach a low temperature, and is then supplied to the room. On the other hand, another mixed air of room and outside airs is supplied as the secondary air to the heat exchanger (30). This mixed air passes through the heat exchanger (30), flows into the dehumidifying means (60), takes moisture from the dehumidifying means (60), and is then discharged to outdoors.

In the twentieth and twenty-first solutions, the primary air is dehumidified by the dehumidifying means (60), is preheated into a higher temperature condition by the preheating means (33), and is then supplied in this condition to the compressor (21). During the time, all of the dehumidified primary air flows into the preheating means (33) in the twentieth solution, while part of the dehumidified primary air flows into the preheating means (33) in the twenty-first solution. When the temperature of the primary air is higher at the inlet of the compressor (21), it will be elevated to a still higher temperature at the outlet of the compressor (21). Correspondingly, the temperature of the secondary air will also be elevated at the outlet of the heat exchanger (30). Accordingly, the humidity medium of the dehumidifying means (60) will release moisture to the secondary air of higher temperature.

In the twenty-second solution, moisture is supplied to the secondary air by the moisture supplying means (41), and this moisture is then evaporated to cool the secondary air. This cooled secondary air is supplied to the heat exchanger (30) to exchange heat with the primary air.

In the twenty-third solution, moisture is supplied to the secondary air in the heat exchanger (30) by the moisture supplying means (42). In the heat exchanger (30), heat is exchanged between the secondary air and the primary air while moisture is evaporated in the secondary air. Then, latent heat of evaporation of water is used to cool the primary air.

In the twenty-fourth solution, the moisture supplying means (41, 42) adequately supplies moisture to the secondary air through the permeable membrane. This ensures that the supplied moisture evaporates in the secondary air.

In the twenty-fifth solution, the secondary air heat exchanged with the primary air in the heat exchanger (30) to reach a high temperature is supplied to the room, thereby heating the room.

In the twenty-sixth solution, a room air is supplied as the primary air to the dehumidifying means (60). This room air is dehumidified by the dehumidifying means (60), is supplied to the compressor (21), sequentially flows through the compressor (21), the heat exchanger (30) and the expander (22), and is then discharged to outdoors. On the other hand, an outside air is supplied as the secondary air to the heat exchanger (30). This outside air is heated up by passing through the heat exchanger (30), flows into the dehumidifying means (60), is humidified by taking moisture from the dehumidifying means (60), and is then supplied to the room.

In the twenty-seventh solution, an outside air is supplied as the primary air to the dehumidifying means (60). This outside air is dehumidified by the dehumidifying means (60), is supplied to the compressor (21), sequentially flows through the compressor (21), the heat exchanger (30) and the expander (22), and is then discharged to outdoors again. On the other hand, another outside air is also supplied as the secondary air to the heat exchanger (30). This outside air is heated up by passing through the heat exchanger (30), flows into the dehumidifying means (60), is humidified by taking moisture from the dehumidifying means (60), and is then supplied to the room.

In the twenty-eighth solution, a room air is supplied as the primary air to the dehumidifying means (60). This room air is dehumidified by the dehumidifying means (60), is supplied to the compressor (21), sequentially flows through the compressor (21), the heat exchanger (30) and the expander (22), and is then discharged to outdoors. On the other hand, another room air is also supplied as the secondary air to the heat exchanger (30). This room air is heated up by passing through the heat exchanger (30), flows into the dehumidifying means (60), is humidified by taking moisture from the dehumidifying means (60), and is then supplied to the room again.

In the twenty-ninth solution, an outside air is supplied as the primary air to the dehumidifying means (60). This outside air is dehumidified by the dehumidifying means (60), is supplied to the compressor (21), sequentially flows through the compressor (21), the heat exchanger (30) and the expander (22), and is then discharged to outdoors again. On the other hand, a room air is supplied as the secondary air to the heat exchanger (30). This room air is heated up by passing through the heat exchanger (30), flows into the dehumidifying means (60), is humidified by taking moisture from the dehumidifying means (60), and is then supplied to the room again.

In the thirtieth solution, a room air is supplied as the primary air to the dehumidifying means (60). This room air is dehumidified by the dehumidifying means (60), is supplied to the compressor (21), sequentially flows through the compressor (21), the heat exchanger (30) and the expander (22), and is then discharged to outdoors. On the other hand, a mixed air of room and outside airs is supplied as the secondary air to the heat exchanger (30). This mixed air is heated by passing through the heat exchanger (30), flows into the dehumidifying means (60), is humidified by taking moisture from the dehumidifying means (60), and is then supplied to the room.

In the thirty-first solution, an outside air is supplied as the primary air to the dehumidifying means (60). This outside air is dehumidified by the dehumidifying means (60), is supplied to the compressor (21), sequentially flows through the compressor (21), the heat exchanger (30) and the expander (22), and is then discharged to outdoors. On the other hand, a mixed air of room and outside airs is supplied as the secondary air to the heat exchanger (30). This mixed air is heated up by passing through the heat exchanger (30), flows into the dehumidifying means (60), is humidified by taking moisture from the dehumidifying means (60), and is then supplied to the room.

In the thirty-second solution, a mixed air of room and outside airs is supplied as the primary air to the dehumidifying means (60). This mixed air is dehumidified by the dehumidifying means (60), is supplied to the compressor (21), sequentially flows through the compressor (21), the heat exchanger (30) and the expander (22), and is then discharged to outdoors. On the other hand, another mixed air of room and outside airs is also supplied as the secondary air to the heat exchanger (30). This mixed air is heated up by passing through the heat exchanger (30), flows into the dehumidifying means (60), is humidified by taking moisture from the dehumidifying means (60), and is then supplied to the room.

In the thirty-third solution, the primary and secondary airs are selected and supplied to the room by the selector means (71, 72). Then, the low-temperature primary air expanded by the expander (22) is supplied to the room to cool it. Alternatively, the high-temperature secondary air heated in the heat exchanger (30) is supplied to the room to heat it. Further, the selector means (71, 72) allows the compressor (21) and the heat exchanger (30) to each take in a predetermined air depending upon the cooling or heating operation.

In the thirty-fourth and thirty-fifth solutions, during the cooling operation, the primary air is dehumidified by the dehumidifying means (60), preheated into a higher temperature condition by the preheating means (33), and supplied in this condition to the compressor (21). During the time, all of the dehumidified primary air flows into the preheating means (33) in the thirty-fourth solution, while part of the dehumidified primary air flows into the preheating means (33) in the thirty-fifth solution. When the temperature of the primary air is higher at the inlet of the compressor (21), it will be elevated to a still higher temperature at the outlet of the compressor (21). Correspondingly, the temperature of the secondary air will also be elevated at the outlet of the heat exchanger (30). Accordingly, the humidity medium of the dehumidifying means (60) will release moisture to the secondary air of higher temperature. On the other hand, during the heating operation, the primary air dehumidified by the dehumidifying means (60) is allowed to bypass the preheating means (33) by the bypassing means (73) and supplied directly to the compressor (21) in both the thirty-fourth and thirty-fifth solutions.

Effects

Thus, according to the present invention, dehumidification of the primary air can be implemented by moisture absorption and release of the humidity medium based on the difference in relative humidity between the primary and secondary airs. Specifically, if the relative humidity of the primary air is high to some extent, the humidity medium absorbs moisture. If the relative humidity of the secondary air is low to some extent, the humidity medium releases moisture. Accordingly, even if the primary and secondary airs have equal vapor partial pressures or equal absolute humidities, a difference in relative humidity between both the airs would cause moisture transfer through the humidity medium. Therefore, dehumidification of the primary air is not limited to after it has been compressed by the compressor (21), unlike the case of dehumidifying it using the conventional vapor isolating membrane, and is possible also before it is supplied to the compressor (21). As a result, layout constraints of the dehumidifying means (60) can be reduced, which enhances the design flexibility.

Further, since there is no need for such dehumidification between the compressor (21) and the expander (22) as conventionally done, an easy and reliable seal is provided between the compressor (21) and the expander (22) while the construction is maintained simply. This prevents leakage of the compressed air and ensures that the efficiency is maintained. Furthermore, air leakage does not result directly in loss of input to the compressor (21) so long as it occurs upstream of the compressor (21). Therefore, the portion upstream of the compressor (21) does not need as complete a seal as between the compressor (21) and the expander (22). This also provides simplified construction.

Still further, since the dehumidifying means (60) releases moisture, which it has taken up from the primary air, to the secondary air, this eliminates the need to dispose of the moisture as a drain. Therefore, any structure for drainage is not required, which simplifies the construction.

According to the second solution, moisture in the humidity medium can be released to the secondary air which has been reduced in relative humidity by the passage through the heat exchanger (30). This ensures that the moisture is released from the humidity medium to adequately regenerate the humidity medium, whereby it is ensured that the primary air is dehumidified. Further, in conducting the heating operation by supplying the secondary air from the humidity medium to the room, the secondary air can be humidified by the moisture removed from the primary air. Accordingly, energy of the moisture in the primary air can be recovered to the secondary air, which provides enhanced energy efficiency.

According to the third to eleventh solutions, the humidity medium of the dehumidifying means (60) can be formed using the solid adsorbent or the liquid absorbent. Particularly according to each of the fourth and eleventh solutions, the dehumidifying means (60) can be formed properly for each particular humidity medium.

According to the twelfth to twenty-fourth solutions, cooling of the room can be implemented by supplying to the room the primary air having reached a low temperature through the sequential passage through the compressor (21), the heat exchanger (30) and the expander (22).

Particularly in the thirteenth, fifteenth, seventeenth and nineteenth solutions, a room air or a mixed air containing the room air is supplied to the heat exchanger (30). In this case, during the cooling operation, the room air is lower in temperature than the outside air. Therefore, the primary air can be cooled to a still lower temperature in the heat exchanger (30) and therefore the air temperature at the inlet of the expander (22) can be reduced. Further, according to the twenty-second to twenty-fourth solutions, moisture is supplied to the secondary air so that the primary air can be cooled to a still lower temperature in the heat exchanger (30). Therefore, the air temperature at the inlet of the expander (22) can be reduced. As a result, each of the above solutions enables reduction in the input to the compressor (21) while maintaining the refrigerating capacity and thereby provides improved. COP (coefficient of performance).

In buildings or the like, the rooms must be not only air conditioned but also ventilated. In such a case, if an outside air is used as the primary air while a room air is used as the secondary air as in the thirteenth solution, the rooms can be ventilated while being cooled. Further, since the primary air is cooled by the room air as the secondary air in the heat exchanger (30), cold heat can be recovered from the room air being discharged to outdoors for ventilation. As a result, energy loss involved in ventilation can be reduced.

According to the twentieth and twenty-first solutions, the temperature of the primary air to be supplied to the compressor (21) can be elevated to a higher degree as compared with the case where it is supplied thereto directly from the dehumidifying means (60). The temperature of the secondary air at the outlet of the heat exchanger (30) can be correspondingly elevated. As a result, regeneration of the humidity medium can be achieved with certainty by the secondary air of higher temperature and low humidity.

According to the twenty-fifth to thirty-second solutions, heating of the room can be implemented by supplying to the room the secondary air which has been heated up by the passage through the heat exchanger (30) and moisturized by the passage through the dehumidifying means (60). Further, as described above, in buildings or the like, the rooms must be not only air conditioned but also ventilated. In such a case, if a room air is used as the primary air and an outside air is used as the secondary air as in the twenty-sixth solution, the rooms can be ventilated while being heated. Furthermore, since the primary air of a room air and the secondary air to be supplied to the room are heat exchanged with each other in the heat exchanger (30), hot heat can be recovered from the room air being discharged to outdoors for ventilation. As a result, energy loss involved in ventilation can be reduced.

According to the thirty-third to thirty-fifth solutions, the cooling and heating operations can be selectively conducted. In addition, according to the thirty-fourth and thirty-fifth solutions, during the heating operation, the bypass means (73) can allow the primary air to bypass the preheating means (33) for supply to the compressor (21).

BEST MODE FOR CARRYING OUT THE INVENTION

Embodiments of the present invention will be hereinafter described with reference to the drawings.

EMBODIMENT 1 OF THE INVENTION

Figure 1:
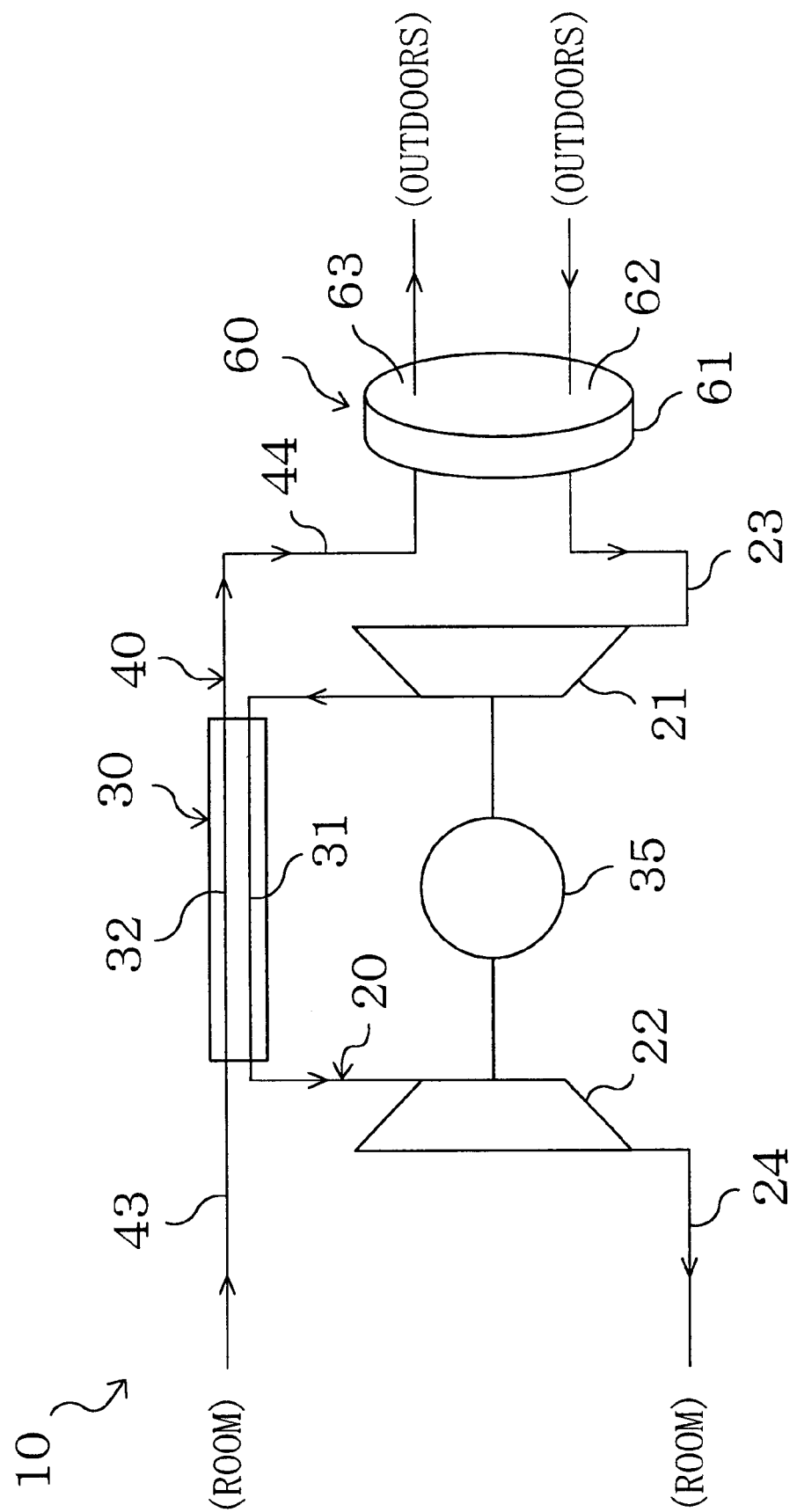
FIG. 1 is a schematic constructional diagram showing the construction of an air conditioning system according to Embodiment 1.

As shown in FIG. 1, an air conditioning system of this embodiment includes a first channel (21), a second channel (20) and a dehumidifying mechanism (60) as a dehumidifying means, and is configured to provide cooling for a room.

The first channel (20) is formed by sequentially connecting a compressor (21), a heat exchanger (30) and an expander (22) through ducts, and is configured to allow a primary air to flow therethrough for air-cycle refrigeration. This first channel (20) includes a first inlet duct (23) connected to the inlet side of the compressor (21), and a first outlet duct (24) connected to the outlet side of the expander (22). The first inlet duct (23) is opened at one end thereof to outdoors to take in an outside air as the primary air. The first outlet duct (24) is opened at one end thereof to the room to introduce the low-temperature primary air coming from the expander (22) into the room.

The second channel (40) is formed by connecting a second inlet duct (43) and a second outlet duct (44) to the inlet side and outlet side of the heat exchanger (30), respectively. The second inlet duct (43) is opened at one end thereof to the room to take in a room air as a secondary air. The second outlet duct (44) is opened at one end thereof to outdoors to discharge the high-temperature secondary air coming from the heat exchanger (30) to outdoors.

The compressor (21) is connected to a motor (35). Further, the compressor (21) is also connected to the expander (22). Thus, the compressor (21) is driven by a driving force of the motor (35) and expansion work of air during expansion in the expander (22).

The heat exchanger (30) is divided into a heat release side passage (31) and a heat absorption side passage (32). The heat release side passage (31) is connected at its one end to the compressor (21) through a duct, is connected at the other end to the expander (22) through a duct, and allows the primary air to flow therethrough. The heat absorption side passage (32) is connected at its one end to the second inlet duct (43), is connected at the other end to the second outlet duct (44), and allows the secondary air to flow therethrough. Further, the heat exchanger (30) is configured to provide heat exchange between the primary air in the heat release side passage (31) and the secondary air in the heat absorption side passage (32) and thereby cool the primary air.

The dehumidifying mechanism (60) is provided partway in the first inlet duct (23) and the second outlet duct (44). This dehumidifying mechanism (60) includes a rotor member (61), a moisture absorbing section (62) and a moisture releasing section (63), and is configured like a so-called rotary-type dehumidifier.

The rotor member (61) has the shape of a disc and is configured to permeate air in the direction of its thickness. This rotor member (61) includes a moisture-adsorbable solid adsorbent and constitutes a humidity medium for contacting air passing through it with the solid adsorbent. In addition, the rotor member (61) is connected to a drive motor as a drive mechanism, which is not shown, and rotatively driven by the drive motor to move between the moisture absorbing section (62) and the moisture releasing section (63). The solid adsorbent in the rotor member (61) is made essentially of porous inorganic compound. As this porous inorganic compound, the compound which has a pore diameter in the order of 0.1 nm to 20 nm and adsorbs moisture may be selected.

The moisture absorbing section (62) is placed partway in the first inlet duct (23). In the moisture absorbing section (62), the primary air in the first inlet duct (23) passes through the rotor member (61) so that moisture in the primary air is adsorbed on the solid adsorbent of the rotor member (61). The primary air is thereby dehumidified.

The moisture releasing section (63) is placed partway in the second outlet duct (44). In the moisture releasing section (63), the secondary air in the second outlet duct (44) passes through the rotor member (61) so that moisture adsorbed on the solid adsorbent of the rotor member (61) is desorbed and released into the secondary air. The solid adsorbent is thereby regenerated.

As described above, the rotor member (61) is driven by the drive motor to move between the moisture absorbing section (62) and the moisture releasing section (63). Specifically, a portion of the rotor member (61) which has taken up moisture from the primary air in the moisture absorbing section (62) moves to the moisture releasing section (63) with the rotation of the rotor member (61). In the moisture releasing section (63), the moisture is desorbed from the solid adsorbent of the rotor member (61) so that the solid adsorbent is regenerated. Namely, the rotor member (61) releases the moisture to the secondary air. Thereafter, the regenerated portion of the rotor member (61) moves to the moisture absorbing section (62) again. The dehumidifying mechanism (60) continuously dehumidifies the primary air by repeating the above actions.

Behavior in Operation

Next, behavior of the air conditioning system (10) in operation will be described.

In the first channel (20), an outside air is taken as a primary air through the first inlet duct (23). This primary air is dehumidified through contact with the rotor member (61) in the moisture absorbing section (62) of the dehumidifying mechanism (60) and then supplied to the compressor (21). In the compressor (21), the primary air is compressed to increase its temperature and pressure. The compressed primary air enters the heat exchanger (30) to flow into the heat release side passage (31) and during the time, it is cooled through heat exchange with a secondary air. The cooled primary air is expanded by the expander (22) to reduce its temperature and pressure. Then, the primary air having reached a low temperature is supplied to a room through the first outlet duct (24).

In the second channel (40), a room air is taken as the secondary air through the second inlet duct (43). This secondary air enters the heat exchanger (30) to flow into the heat absorption side passage (32) and during the time, it is heat exchanged with the primary air. This heat exchange increases the temperature of the secondary air with accompanying decrease in its relative humidity. Thereafter, the secondary air enters the moisture releasing section (63) of the dehumidifying mechanism (60) through the second outlet duct (44). In the moisture releasing section (63), the secondary air contacts with the rotor member (61) so that the rotor member (61) releases moisture to the secondary air. The secondary air having taken the moisture from the rotor member (61) is discharged to outdoors through the second outlet duct (44) again.

In the dehumidifying mechanism (60), the rotor member (61) is driven into rotation. This rotor member (61) thereby moves between the moisture absorbing section (62) and the moisture releasing section (63) to repeat moisture absorption in the moisture absorbing section (62) and moisture release in the moisture releasing section (63). This provides continuous dehumidification of the primary air.

Effects of Embodiment 1

According to Embodiment 1, moisture is adsorbed on or desorbed from the solid adsorbent of the rotor member (61) based on the difference in relative humidity between the primary and secondary airs. This implements dehumidification of the primary air. Therefore, dehumidification of the primary air is not limited to after it has been compressed by the compressor (21), unlike the case of dehumidifying it using the conventional vapor isolating membrane, and is possible also before it is supplied to the compressor (21). As a result, layout constraints of the dehumidifying mechanism (60) can be reduced, which enhances the design flexibility.

Further, since there is no need for such dehumidification between the compressor (21) and the expander (22) as conventionally done, an easy and reliable seal is provided between the compressor (21) and the expander (22) while the construction is maintained simply. This prevents leakage of the compressed air and ensures that the efficiency is maintained. Furthermore, air leakage does not result directly in loss of input to the compressor (21) so long as it occurs upstream of the compressor (21). Therefore, this embodiment does not need such a complete seal as in the conventional case. This also provides simplified construction.

Still further, since the dehumidifying mechanism (60) releases moisture, which it has taken up from the primary air, to the secondary air, this eliminates the need to dispose of the moisture as a drain. Therefore, any structure for drainage is not required, which simplifies the construction.

Still further, the rotor member (61) releases moisture to the secondary air which has been reduced in relative humidity by the passage through the heat exchanger (30). This ensures that the moisture is desorbed from the solid adsorbent of the rotor member (61) to adequately regenerate the rotor member (61), whereby it is ensured that the primary air is dehumidified.

Still further, since an outside air is used as the primary air while a room air is used as the secondary air, this enables not only cooling but also ventilation. In this case, in the heat exchanger (30), the secondary air of a room air cools the compressed primary air. Therefore, cold heat can be recovered from the room air being discharged to outdoors for ventilation. As a result, energy loss involved in ventilation can be reduced.

Still further, since the room air is lower in temperature than the outside air during the cooling operation, the primary air will be cooled by the secondary air of low temperature in the heat exchanger (30). Therefore, the primary air can be cooled to a still lower temperature in the heat exchanger (30) and therefore the air temperature at the inlet of the expander (22) can be reduced. As a result, this embodiment enables reduction in the input to the compressor (21) while maintaining the refrigerating capacity and thereby provides improved COP (coefficient of performance).

EMBODIMENT 2 OF THE INVENTION

In Embodiment 2 of the present invention, a humidifier/cooler (41) and a water introducing section (42) are provided in addition to the construction of Embodiment 1 described above. Other structures are the same as in Embodiment 1.

Figure 2:
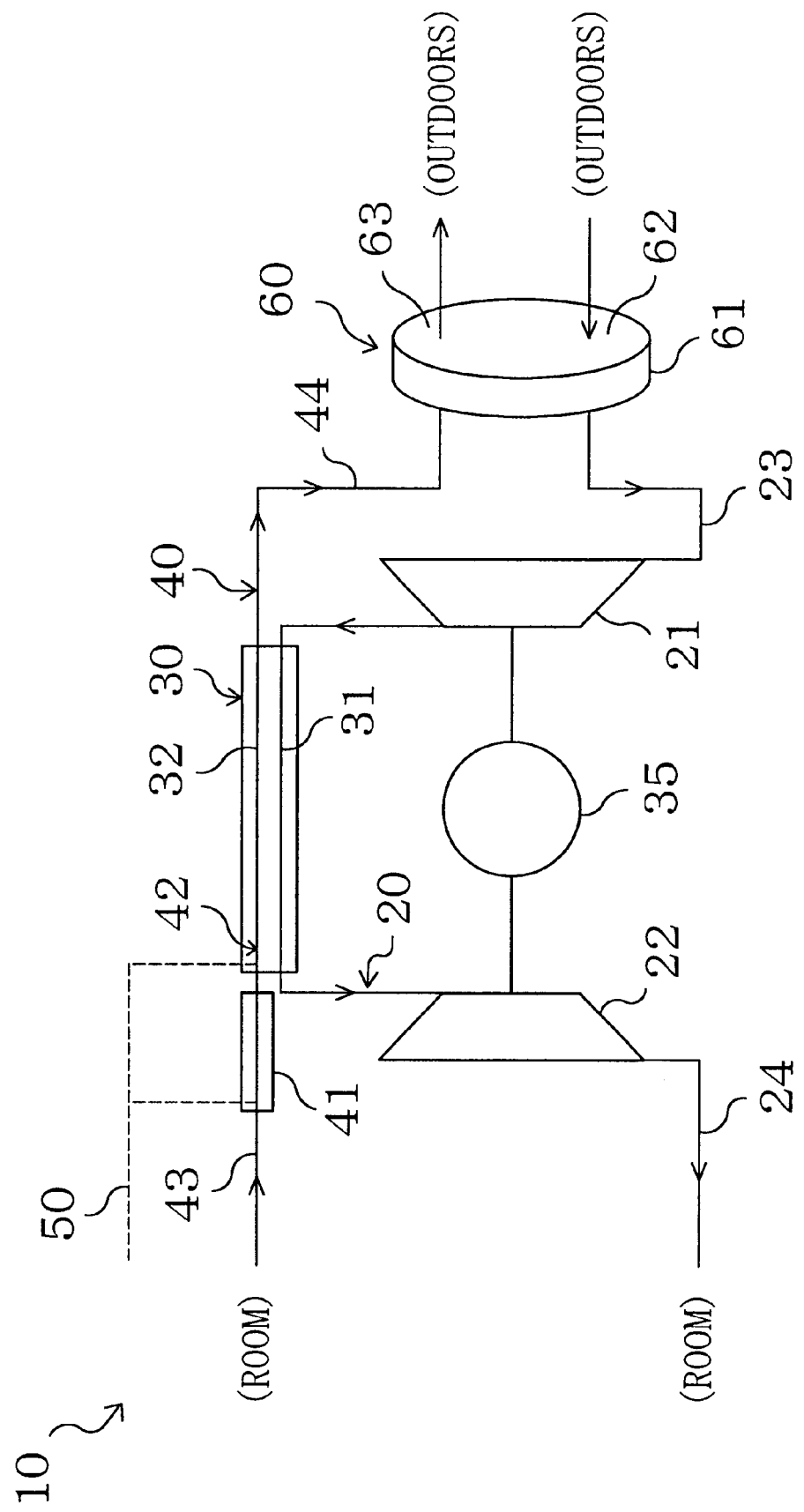
FIG. 2 is a schematic constructional diagram showing the construction of an air conditioning system according to Embodiment 2.

As shown in FIG. 2, the humidifier/cooler (41) is disposed partway in the second inlet duct (43), i.e., in a portion of the second channel (40) upstream of the heat exchanger (30). The humidifier/cooler (41) is provided with a permeable membrane capable of permeating moisture, and divided into air side and water side spaces by the permeable membrane. The air side space is communicated with the second inlet duct (43) so that the secondary air flows therethrough. The water side space is communicated with a water pipe (50) so that city water or the like is supplied thereto. In the humidifier/cooler (41), moisture in the water side space is supplied to the secondary air in the air side space by the permeation through the permeable membrane, and the supplied water is evaporated in the secondary air thereby cooling the secondary air. In other words, the humidifier/cooler (41) constitutes a moisture supplying means (41) for humidifying and cooling the secondary air to be supplied to the heat exchanger (30).

The water introducing section (42) is disposed in the heat absorption side passage (32) of the heat exchanger (30). The water introducing section (42) is provided with a permeable membrane capable of permeating moisture, wherein a water side space is formed on one side of the permeable membrane and the side of the permeable membrane opposite to the water side space constitutes the heat absorption side passage (32) of the heat exchanger (30). The water side space is communicated with the water pipe (50) so that city water or the like is supplied thereto. In the water introducing section (42), moisture in the water side space is supplied to the secondary air in the heat absorption side passage (32) by the permeation through the permeable membrane.

As described above, the water introducing section (42) supplies moisture to the secondary air in the heat absorption side passage (32). Accordingly, in the heat absorption side passage (32), the secondary air is heated up through heat exchange with the primary air and at the same time the moisture in the secondary air is evaporated. This suppresses temperature rise of the secondary air and ensures the temperature differential of the secondary air from the primary air. In other words, the water introducing section (42) constitutes a moisture supplying means (42) for supplying moisture to the secondary air in order to use latent heat of evaporation to cool the primary air.

Behavior in Operation

Figure 3:
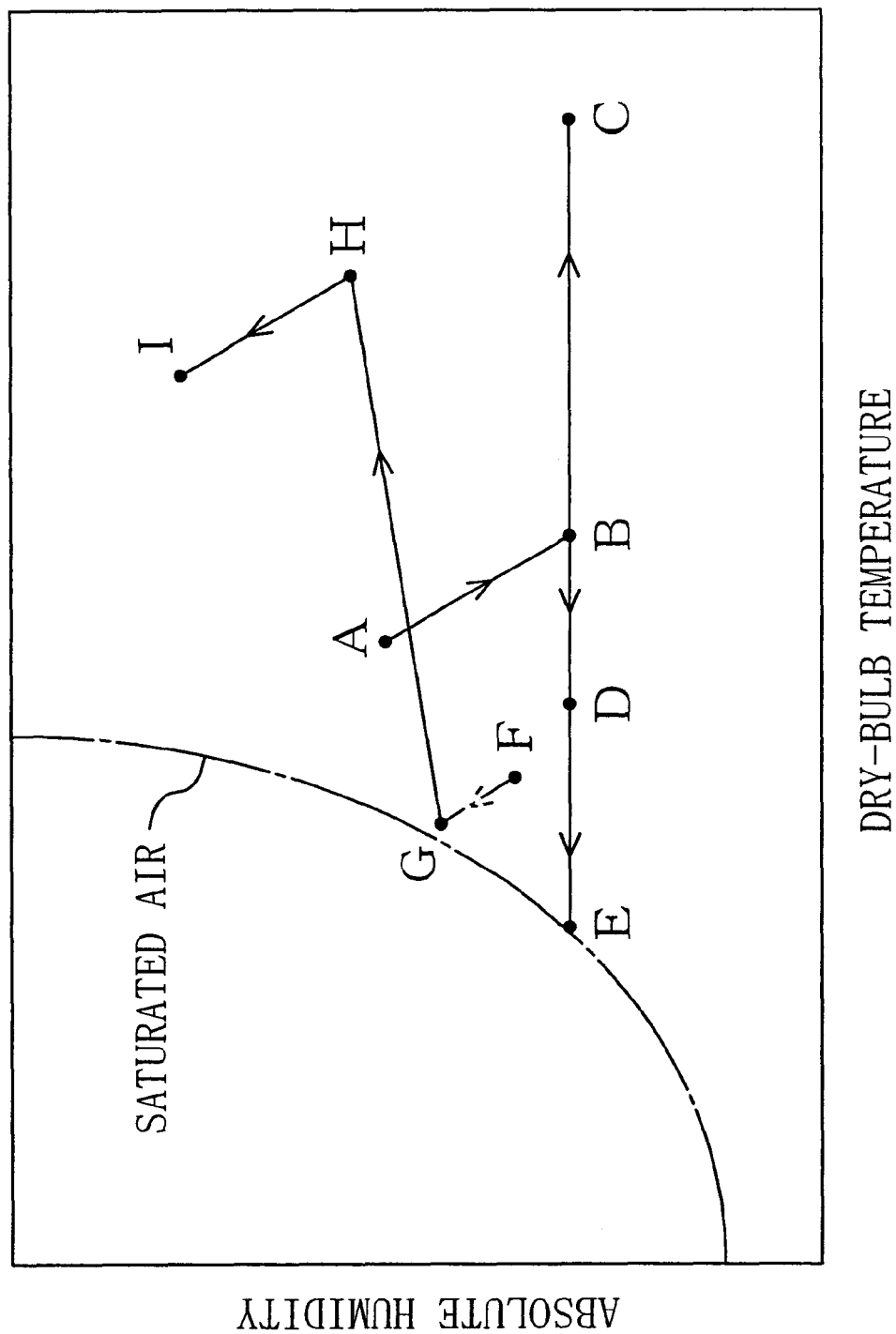
FIG. 3 is a psychrometric chart showing behavior of the air conditioning system according to Embodiment 2.

Next, behavior of the air conditioning system (10) in operation will be described with reference to the psychrometric chart of FIG. 3.

In the first channel (20), an outside air in a state of point A is taken as a primary air through the first inlet duct (23). This primary air is dehumidified through contact with the rotor member (61) in the moisture absorbing section (62) of the dehumidifying mechanism (60) to reduce its absolute humidity and increase its temperature, so that it changes from the state of point A to a state of point B along an isenthalpic line. The primary air in the state of point B is compressed by the compressor (21) to increase its temperature and pressure while maintaining a constant absolute humidity, so that it comes to a state of point C. The primary air in the state of point C enters the heat exchanger (30) to flow into the heat release side passage (31) and exchange heat with the secondary air in the heat absorption side passage (32). The primary air is cooled through this heat exchange to reduce its temperature while maintaining the constant absolute humidity, so that it comes to a state of point D. The primary air in the state of point D is expanded by the expander (22) to reduce its temperature and pressure while maintaining the constant absolute humidity, so that it comes to a state of point E. Then, the primary air in the state of point E is supplied to a room through the first outlet duct (24).

In the second channel (40), a room air in a state of point F is taken as the secondary air through the second inlet duct (43). This secondary air enters the humidifier/cooler (41) so that it is supplied with moisture, and the supplied moisture is evaporated in the secondary air. The secondary air thereby increases its absolute humidity and reduces its temperature, so that it changes from the state of point F to a state of point G along an isenthalpic line. The secondary air in the state of point G enters the heat exchanger (30) to flow into the heat absorption side passage (32) and exchanges heat with the primary air in the heat release side passage (31). During the time, moisture is supplied to the secondary air in the water introducing section (42) of the heat exchanger (30), and the supplied moisture is evaporated in the secondary air. The secondary air thereby increases its absolute humidity and temperature so that it changes from the state of point G to a state of point H. The secondary air in the state of point H enters the moisture releasing section (63) of the dehumidifying mechanism (60) through the second outlet duct (44). In the moisture releasing section (63), the secondary air contacts the rotor member (61) so that the rotor member (61) releases moisture to the secondary air. The secondary air thereby increases its absolute humidity and reduces its temperature so that it changes to the state of point H to a state of point I along an isenthalpic line. The secondary air in the state of point I is discharged to outdoors through the second outlet duct (44) again.

In the dehumidifying mechanism (60), the rotor member (61) is driven into rotation. This rotor member (61) thereby moves between the moisture absorbing section (62) and the moisture releasing section (63) to repeat moisture absorption in the moisture absorbing section (62) and moisture release in the moisture releasing section (63). This provides continuous dehumidification of the primary air.

Effects of Embodiment 2

According to Embodiment 2, the following effects can be obtained in addition to the effects of Embodiment 1.

Specifically, in this embodiment, the humidifier/cooler (41) is provided to supply moisture to the secondary air, and the secondary air is cooled therein and then supplied to the heat exchanger (30). Further, the water introducing section (42) is provided to supply moisture to the secondary air in the heat absorption side passage (32), and latent heat of evaporation of the moisture is used to cool the primary air in the heat exchanger (30). Therefore, the primary air can be cooled to a still lower temperature in the heat exchanger (30) than in the case of Embodiment 1. This makes it possible to drop the air temperature at the inlet of the expander (22) to a lower degree. As a result, this embodiment enables further reduction in the input to the compressor (21) while maintaining the refrigerating capacity and thereby provides improved COP (coefficient of performance) with higher reliability.

EMBODIMENT 3 OF THE INVENTION

In Embodiment 3 of the present invention, a preheater (33) is provided in addition to the construction of Embodiment 2 described above, and the heat exchanger (30) in Embodiment 2 is composed of a first heat exchange section (30a) and a second heat exchange section (30b). Other structures are the same as in Embodiment 2.

Figure 4:
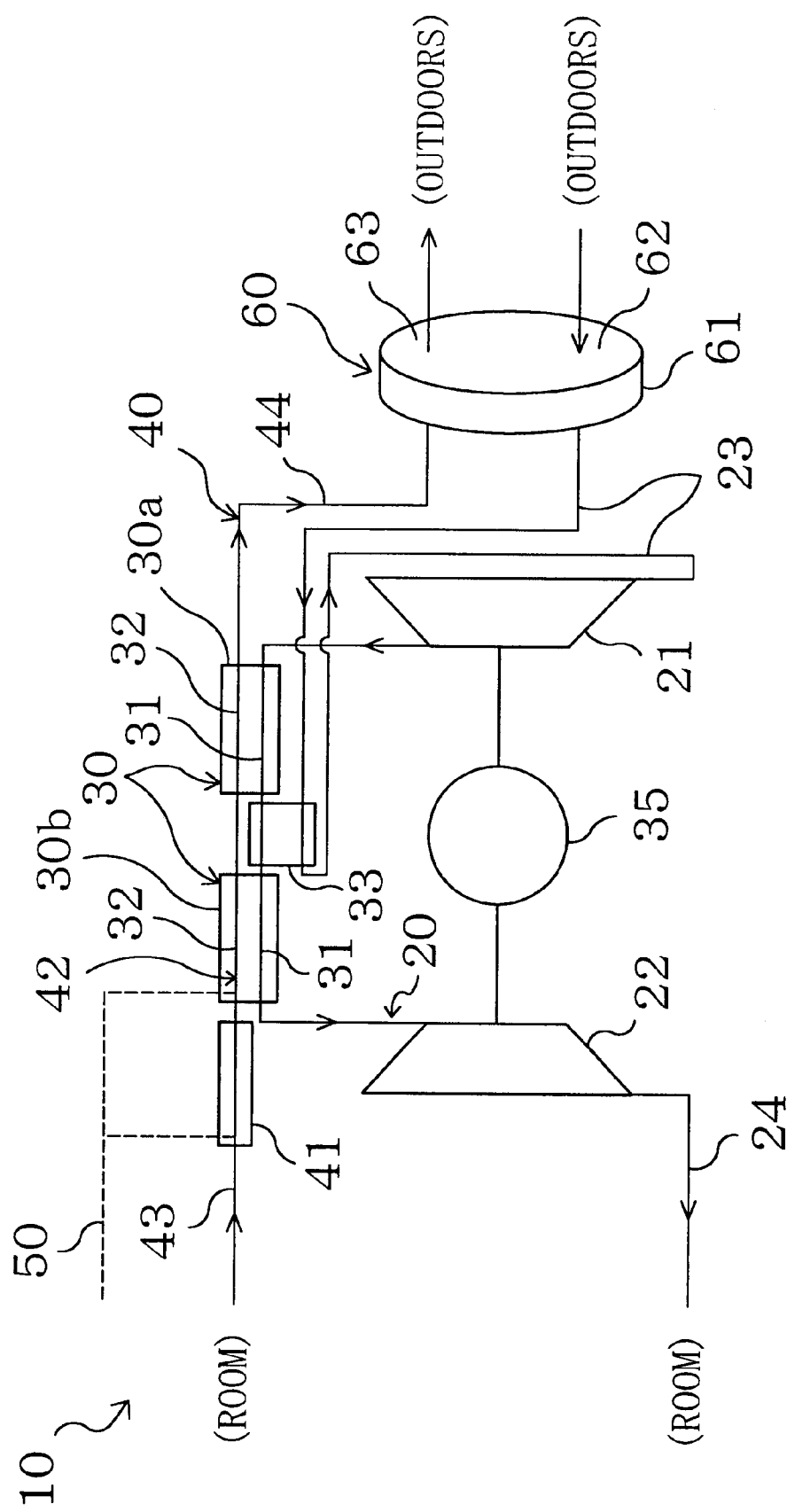
FIG. 4 is a schematic constructional diagram showing the construction of an air conditioning system according to Embodiment 3.

As shown in FIG. 4, the first heat exchange section (30a) and the second heat exchange section (30b) of the heat exchanger (30) are each provided with a heat release side passage (31) and a heat absorption side passage (32). The heat release side passage (31) at the side of the first heat exchange section (30a) is connected to the compressor (21), while the heat release side passage (31) at the side of the second heat exchange section (30b) is connected to the expander (22). The heat absorption side passage (32) at the side of the second heat exchange section (30b) is connected to the second inlet duct (43), while the heat absorption side passage (32) at the side of the first heat exchange section (30a) is connected to the second outlet duct (44).

The preheater (33) is disposed between the first heat exchange section (30a) and the second heat exchange section (30b) and connected to the heat release side passages (31) of both the heat exchange sections (30a, 30b). Further, both ends of the preheater (33) are connected to the first inlet duct (23) leading from the dehumidifying mechanism (60) to the compressor (21). The preheater (33) thereby heats the primary air, which is being supplied to the compressor (21) following dehumidification in the dehumidifying mechanism (60), through heat exchange with the primary air having reached a high temperature as a result of compression in the compressor (21).

Behavior in Operation

In this embodiment, a cooling operation is effected substantially in the same behavior as in Embodiment 2. In this embodiment, however, the dehumidified primary air is supplied to the compressor (21) following the passage through the preheater (33).

Specifically, the primary air is dehumidified in the moisture absorbing section (62) of the dehumidifying mechanism (60) and then enters the preheater (33) through the first inlet duct (23). In the preheater (33), the primary air having entered through the first inlet duct (23) is heated up through heat exchange with the primary air having been compressed by the compressor (21). The heated primary air flows through the first inlet duct (23) again and is then supplied to the compressor (21).

In other words, the dehumidified primary air is preheated in the preheater (33) and then enters the compressor (21). Accordingly, in this embodiment, the temperature of the primary air at the inlet of the compressor (21) becomes higher than that in the state of point B of FIG. 3, and the temperature of the primary air at the outlet of the compressor (21) correspondingly becomes higher than that in the state of point C of FIG. 3.

This means that the temperature of the primary air at the inlet of the heat exchanger (30) becomes higher than that in Embodiment 2. Accordingly, the secondary air is heat exchanged with the primary air of higher temperature in the heat exchanger (30) so that the temperature of the secondary air at the outlet of the heat exchanger (30) becomes higher than that in the state of point H of FIG. 3. Further, since the temperature of the primary air at the inlet of the heat exchanger (30) is elevated, the temperature differential equivalent to that in Embodiment 2 can be ensured even if the temperature of the secondary air is high in the heat absorption side passage (32). Therefore, the amount of moisture supplied to the secondary air in the humidifier/cooler (41) and the water introducing section (42) is reduced so that the absolute humidity of the secondary air at the outlet of the heat exchanger (30) becomes lower than that in the state of point H of FIG. 3. The secondary air having exited from the heat exchanger (30) enters the moisture releasing section (63) of the dehumidifying mechanism (60) through the second outlet duct (44), and the rotor member (61) releases moisture therein to the secondary air.

In this case, the primary air at the inlet of the heat exchanger (30) becomes higher than that in Embodiment 2.

However, this primary air is heat exchanged not only with the primary air in the first heat exchange section (30a) and the second heat exchange section (30b) of the heat exchanger (30) but also with a yet-to-be compressed primary air in the preheater (33). Accordingly, the temperature of the primary air at the outlet of the heat exchanger (30), i.e., at the inlet of the expander (22), becomes equal to that in Embodiment 2, which ensures the cooling capacity equivalently to Embodiment 2.

Effects of Embodiment 3

According to Embodiment 3, the following effects can be obtained in addition to the effects of Embodiment 2.

Specifically, according to this embodiment, the temperature of the primary air at the inlet of the compressor (21) can be elevated as compared with Embodiment 2. Further, the temperature of the secondary air at the outlet of the heat exchanger (30) can be accordingly elevated. Even with the same absolute humidity, rise in temperature of the air leads to drop in relative humidity thereof. Further, in this embodiment, since the amount of moisture supplied to the secondary air in the humidifier/cooler (41) and the water introducing section (42) can be reduced, the absolute humidity of the secondary air at the outlet of the heat exchanger (30) can be lowered. Accordingly, in this embodiment, the rotor member (61) will release moisture to the secondary air higher in temperature and lower in relative humidity than that in Embodiment 2. This makes it possible to regenerate the solid adsorbent of the rotor member (61) with higher reliability.

Modified Example of Embodiment 3

In this embodiment, the preheater (33) may be disposed in the following manner.

Figure 5:
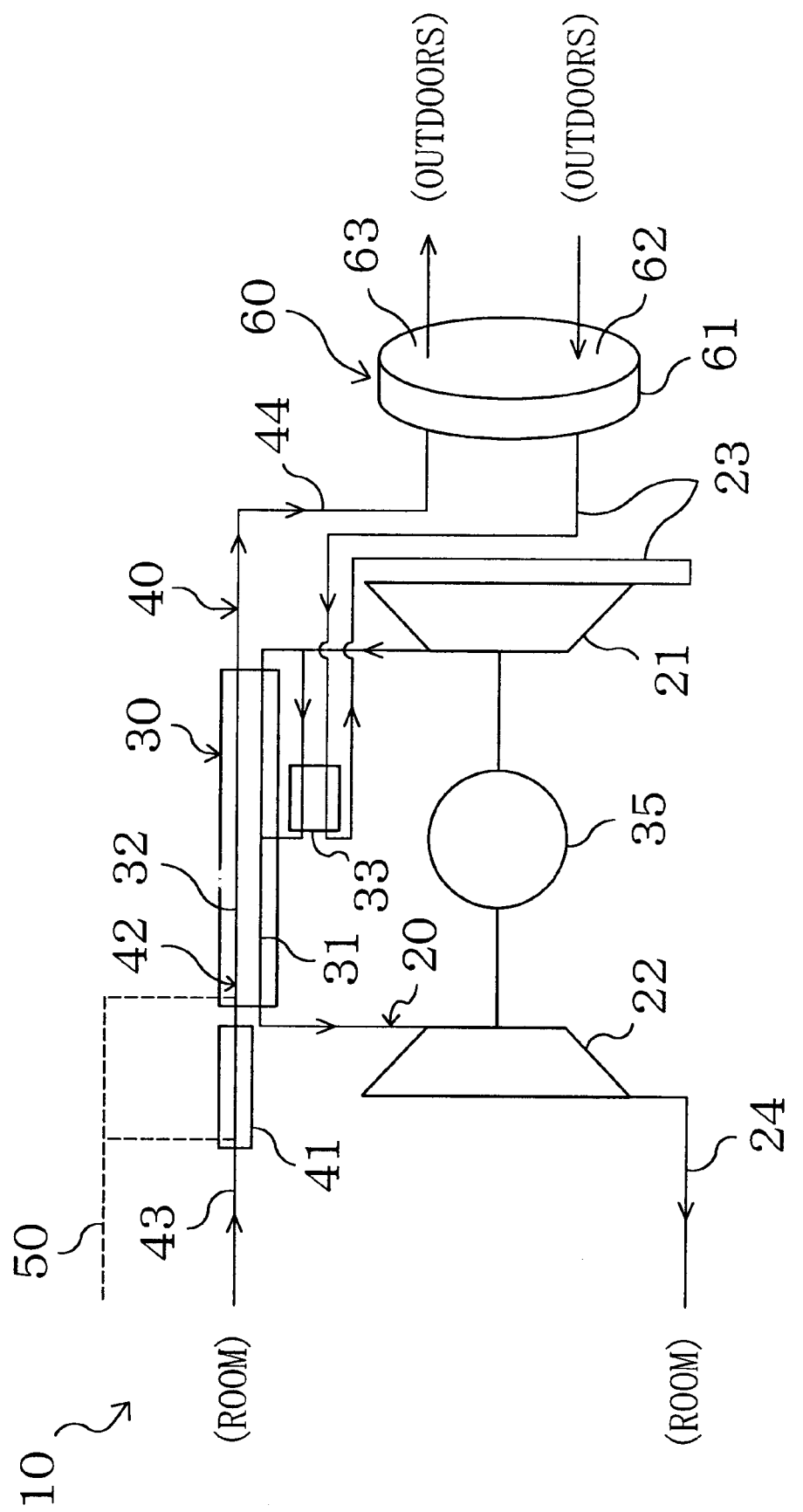
FIG. 5 is a schematic constructional diagram showing the construction of an air conditioning system according to a modified example of Embodiment 3.

As shown in FIG. 5, in this modified example, both ends of the preheater (33) are connected to the first inlet duct (23) leading from the dehumidifying mechanism (60) to the compressor (21). This point is the same as in Embodiment 3 described above. However, in this modified example, the primary air compressed by the compressor (21) is distributed so that part thereof is conducted to the preheater (33) and the remaining part is supplied to the heat exchanger (30). In the preheater (33), the yet-to-be compressed primary air is heated up through heat exchange with the part of the compressed primary air. The primary air heated up in the preheater (33) is supplied to the compressor (21). On the other hand, the compressed primary air having exited from the preheater (33) is conducted to the heat release side passages (31) of the heat exchanger (30), and then combined with the primary air having entered the heat exchanger (30) directly from the compressor (21).

EMBODIMENT 4 OF THE INVENTION

The air conditioning system (10) of Embodiment 4 is arranged to provide heating for a room.

Figure 6:
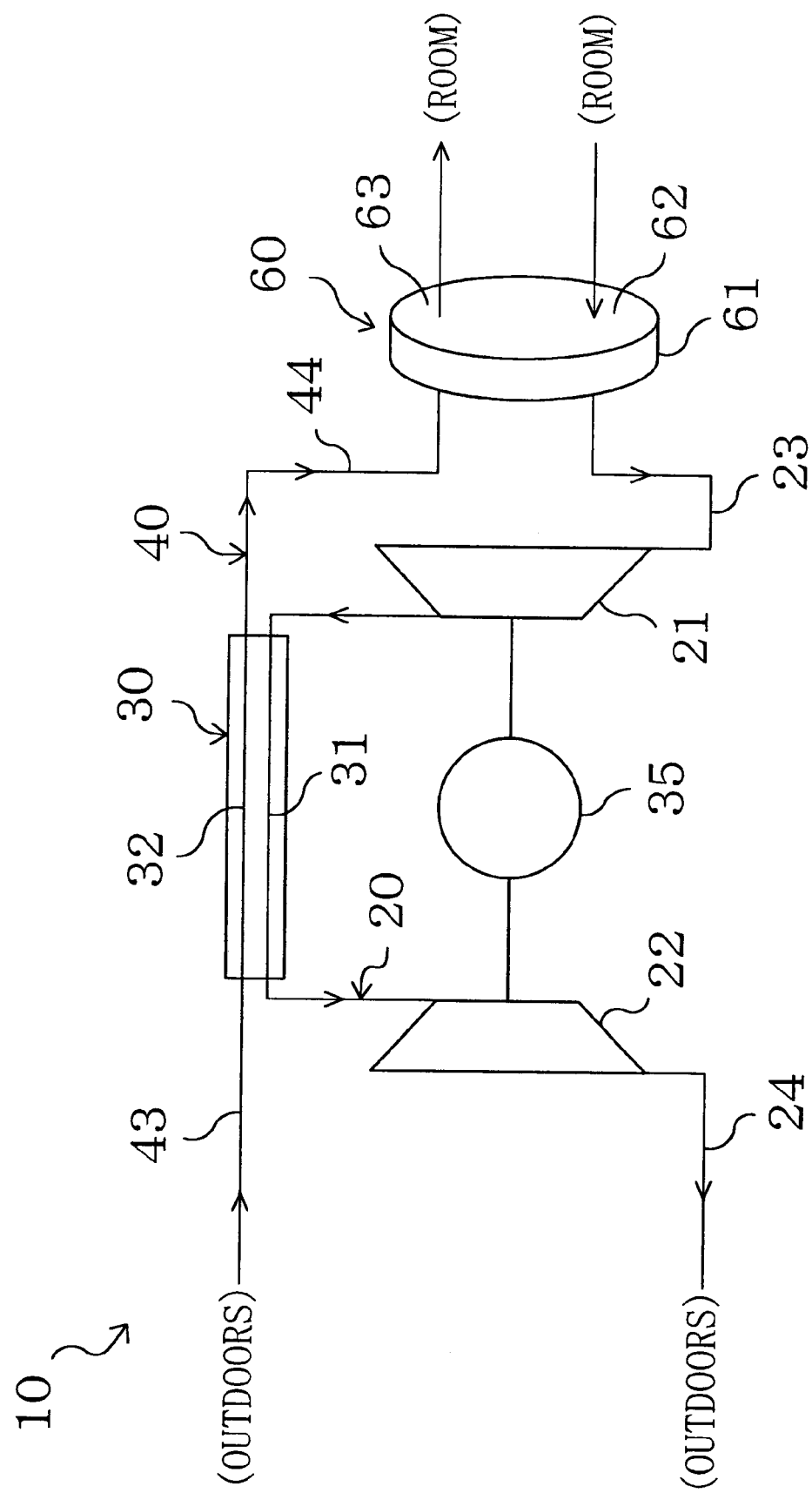
FIG. 6 is a schematic constructional diagram showing the construction of an air conditioning system according to Embodiment 4.

As shown in FIG. 6, this air conditioning system (10) is configured substantially in the same manner as Embodiment 1, but is different from that in the following points. Specifically, in the first channel (20), the first inlet duct (23) is opened at its one end to the room to take in a room air as a primary air. Further, the first outlet duct (24) is opened at its one end to outdoors to discharge outdoors the low-temperature primary air coming from the expander (22). On the other hand, in the second channel (40), the second inlet duct (43) is opened at its one end to outdoors to take in an outside air as a secondary air. Further, the second outlet duct (44) is opened at its one end to the room to supply the high-temperature secondary air coming from the heat exchanger (30) to the room. Other structures are the same as in Embodiment 1.

Behavior in Operation

Figure 7:
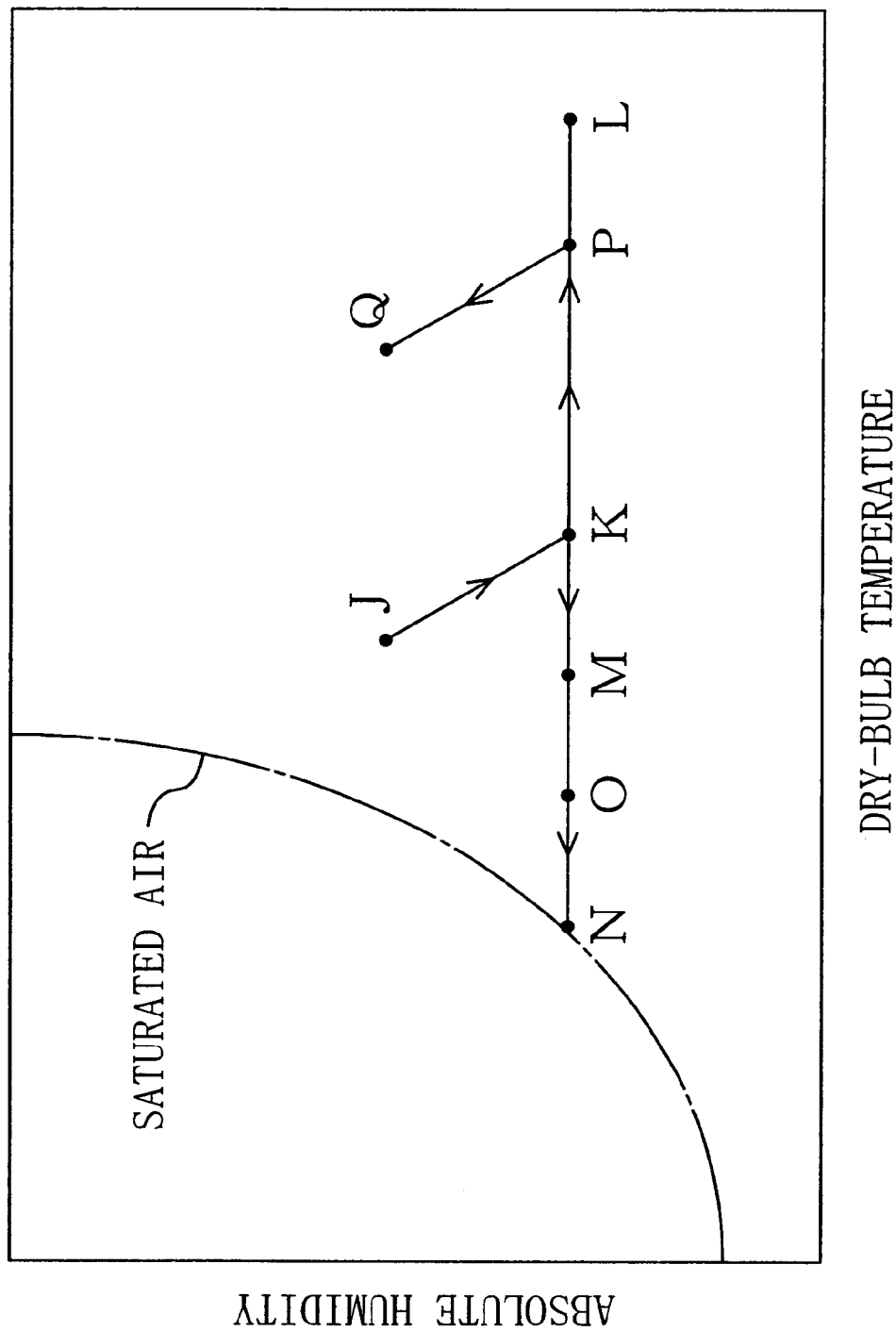
FIG. 7 is a schematic constructional diagram showing the construction of an air conditioning system according to Embodiment 4.

Next, behavior of the air conditioning system (10) in operation will be described with reference to the psychrometric chart of FIG. 7.

In the first channel (20), a room air in a state of point J is taken as a primary air through the first inlet duct (23). This primary air is dehumidified through contact with the rotor member (61) in the moisture absorbing section (62) of the dehumidifying mechanism (60) to reduce its absolute humidity and increase its temperature, so that it changes from the state of point J to a state of point K along an isenthalpic line. The primary air in the state of point K is compressed by the compressor (21) to increase its temperature and pressure while maintaining a constant absolute humidity, so that it comes to a state of point L. The primary air in the state of point L enters the heat exchanger (30) to flow into the heat release side passage (31) and exchanges heat with a secondary air in the heat absorption side passage (32). The primary air is cooled through this heat exchange to reduce its temperature while maintaining the constant absolute humidity, so that it comes to a state of point M. The primary air in the state of point M is expanded by the expander (22) to reduce its temperature and pressure while maintaining the constant absolute humidity, so that it comes to a state of point N. Then, the primary air in the state of point N is discharged to outdoors through the first outlet duct (24).

In the second channel (40), an outside air in a state of point O is taken as the secondary air through the second inlet duct (43). The secondary air in the state of point O enters the heat exchanger (30) to flow into the heat absorption side passage (32) and exchanges heat with the primary air in the heat release side passage (31). The secondary air thereby increases its temperature while maintaining the constant absolute humidity so that it changes from the state of point O to a state of point P. The secondary air in the state of point P enters the moisture releasing section (63) of the dehumidifying mechanism (60) through the second outlet duct (44). In the moisture releasing section (63), the secondary air contacts the rotor member (61) so that the rotor member (61) releases moisture to the secondary air. In other words, the secondary air is humidified in the moisture releasing section (63). The secondary air thereby increases its absolute humidity and reduces its temperature so that it changes to the state of point P to a state of point Q along a isenthalpic line. The secondary air in the state of point Q is supplied to the room through the second outlet duct (44) again.

In the dehumidifying mechanism (60), the rotor member (61) is driven into rotation. This rotor member (61) thereby moves between the moisture absorbing section (62) and the moisture releasing section (63) to repeat moisture absorption in the moisture absorbing section (62) and moisture release in the moisture releasing section (63). This provides continuous dehumidification of the primary air and continuous humidification of the secondary air.

Effects of Embodiment 4

In Embodiment 4, dehumidification of the primary air is effected by the rotor member (61) having the solid adsorbent like Embodiment 1. Therefore, according to this embodiment, the effects of improving design flexibility and simplifying the construction can be obtained like Embodiment 1.

Further, since a room air is used as the primary air while an outside air is used as the secondary air, this enables not only heating but also ventilation. In this case, in the heat exchanger (30), the secondary air of an outside air cools the compressed primary air. Therefore, hot heat can be recovered from the room air being discharged to outdoors for ventilation. Further, in the moisture releasing section (63) of the dehumidifying mechanism (60), the rotor member (61) releases moisture to the secondary air. In other words, the secondary air to be supplied to the room can be humidified by the moisture removed from the primary air of a room air. Therefore, the moisture contained in the room air to be discharged to outdoors can be recovered. As a result, energy of the room air being discharged can be recovered inclusive of energy of the moisture in the room air, which further reduces energy loss involved in ventilation.

EMBODIMENT 5 OF THE INVENTION

Embodiment 5 of the present invention is arranged to accomplish both cooling and heating operations by providing a first four-way selector valve (71) and a second four-way selector valve (72) each as a selector means in addition to the construction of Embodiment 2 described above. The following description will be made about structures different from Embodiment 2.

Figure 8:
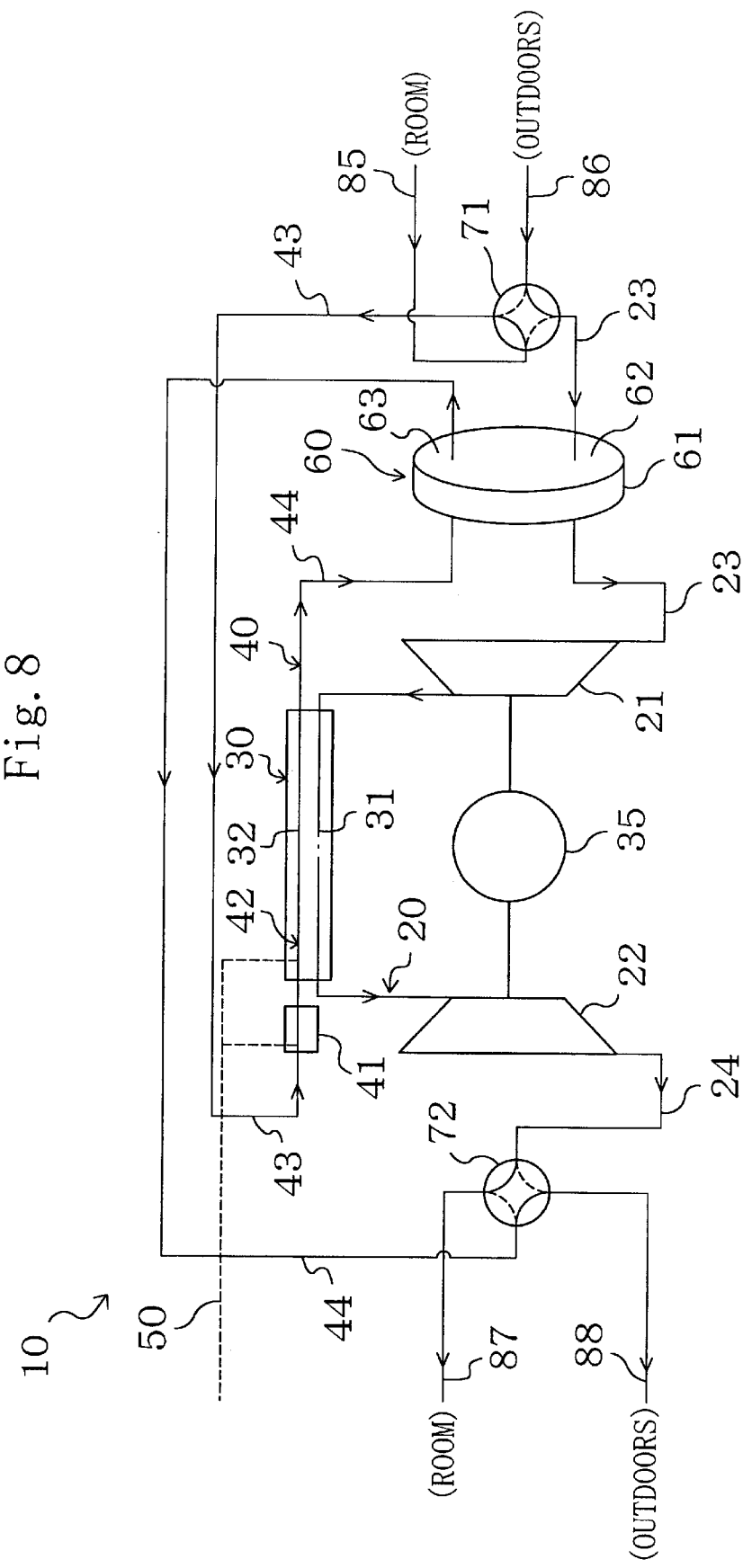
FIG. 8 is a schematic constructional diagram showing the construction of an air conditioning system according to Embodiment 5.

As shown in FIG. 8, the first inlet duct (23) of the first channel (20) is connected at its one end to the first four-way selector valve (71). The second inlet duct (43) of the second channel (40) is also connected at its one end to the first four-way selector valve (71). Further, the first four-way selector valve (71) is connected to a room air duct (85) and an outside air duct (86). The room air duct (85) is opened at its one end to a room to take in a room air. The outside air duct (86) is opened at its one end to outdoors to take in an outside air.

The first outlet duct (24) of the first channel (20) is connected at its one end to the second four-way selector valve (72). The second outlet duct (44) of the second channel (40) is also connected at its one end to the second four-way selector valve (72). Further, the second four-way selector valve (72) is connected to a supply duct (87) and a discharge duct (88). The supply duct (87) is opened at its one end to the room to supply air thereto. The discharge duct (88) is opened at its one end to outdoors to discharge air thereto.

Behavior in Operation

During the cooling operation, the first four-way selector valve (71) and the second four-way selector valve (72) are switched to the positions as indicated in solid lines in FIG. 8. Thus, the outside air duct (86) is communicated with the first inlet duct (23), while the room air duct (85) is communicated with the second inlet duct (43). Further, the first outlet duct (24) is communicated with the supply duct (87), while the second outlet duct (44) is communicated with the discharge duct (88). In these conditions, the system operates in the same manner as in Embodiment 2 thereby effecting the cooling operation.

Specifically, in the first channel (20), the first inlet duct (23) takes in an outside air as the primary air through the outside air duct (86). This primary air sequentially flows through the dehumidifying mechanism (60), the compressor (21), the heat exchanger (30) and the expander (22) and is supplied to the room through the first outlet duct (24) and the supply duct (87).

On the other hand, in the second channel (40), the second inlet duct (43) takes in a room air as the secondary air through the room air duct (85). This secondary air sequentially flows through the humidifier/cooler (41), the heat exchanger (30) and the dehumidifying mechanism (60), and is discharged to outdoors through the second outlet duct (44) and the discharge duct (88).

During the heating operation, the first four-way selector valve (71) and the second four-way selector valve (72) are switched to the positions as indicated in dash lines in FIG. 8. Thus, the outside air duct (86) is communicated with the second inlet duct (43), while the room air duct (85) is communicated with the first inlet duct (23). Further, the second outlet duct (44) is communicated with the supply duct (87), while the first outlet duct (24) is communicated with the discharge duct (88). It is to be noted that during the heating operation, no moisture is supplied from the humidifier/cooler (41) and the water introducing section (42) to the secondary air. Therefore, in this embodiment, the system operates in the same manner as in Embodiment 4 thereby effecting the heating operation.

Specifically, in the first channel (20), the first inlet duct (23) takes in a room air as the primary air through the room air duct (85). This primary air sequentially flows through the dehumidifying mechanism (60), the compressor (21), the heat exchanger (30) and the expander (22), and is discharged to outdoors through the first outlet duct (24) and the discharge duct (88).

On the other hand, in the second channel (40), the second inlet duct (43) takes in an outside air as the secondary air through the outside air duct (86). This secondary air sequentially flows through the humidifier/cooler (41), the heat exchanger (30) and the dehumidifying mechanism (60), and is supplied to the room through the second outlet duct (44) and the supply duct (87).

EMBODIMENT 6 OF THE INVENTION

Embodiment 6 of the present invention is arranged to accomplish both cooling and heating operations by providing a first four-way selector valve (71) and a second four-way selector valve (72) each as a selector means and a third four-way selector valve (73) as a bypassing means in addition to the construction of Embodiment 3 described above.

Figure 9:
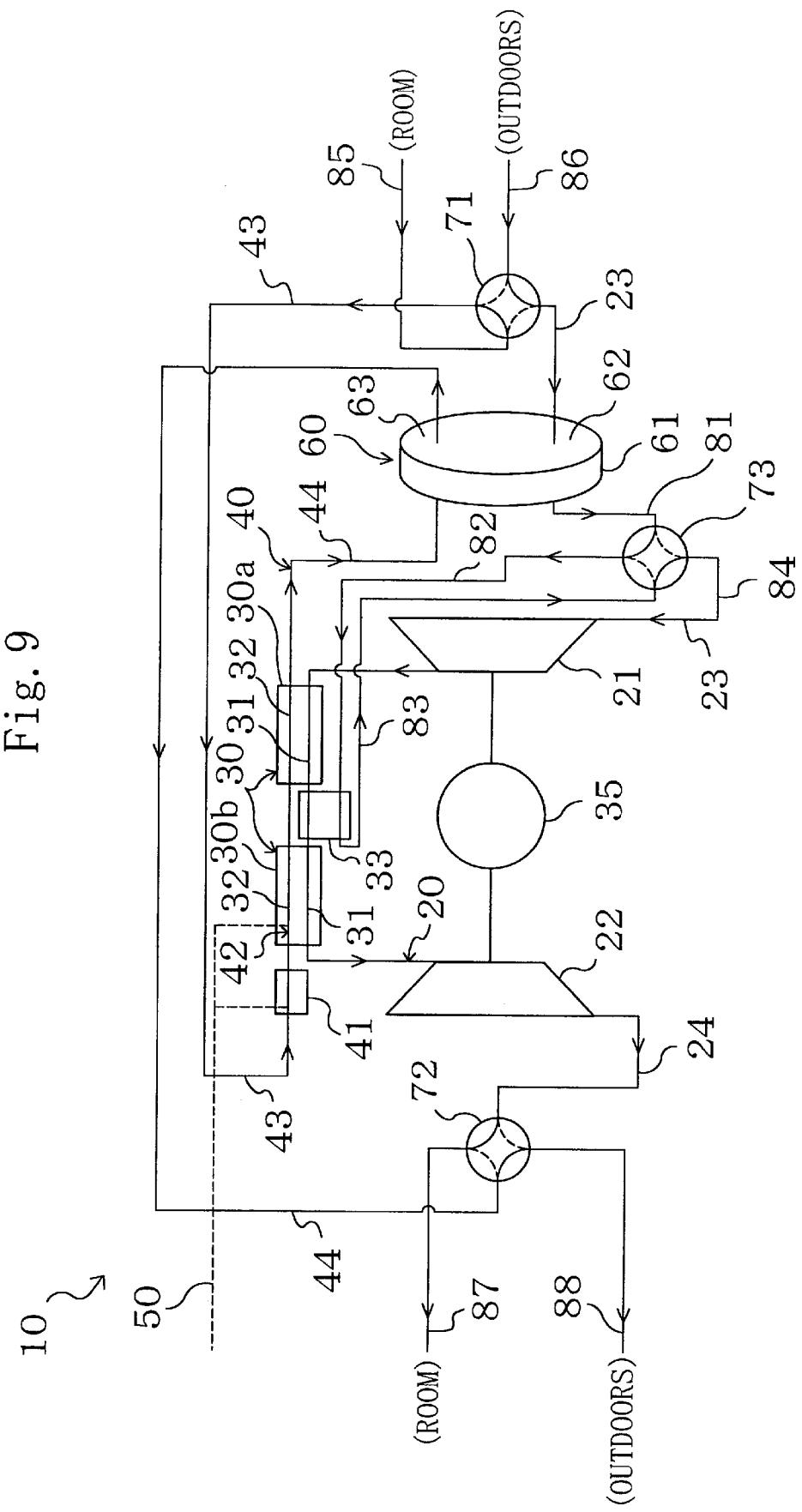
FIG. 9 is a schematic constructional diagram showing the construction of an air conditioning system according to Embodiment 6.

As shown in FIG. 9, in this embodiment, the first four-way selector valve (71) is connected to the room air duct (85), the outside air duct (86), the first inlet duct (23) and the second inlet duct (43) like Embodiment 5, and the room air duct (85) and the outside air duct (86) are structured likewise. Further, the second four-way selector valve (72) is likewise connected to the supply duct (87), the discharge duct (88), the first outlet duct (24) and the second outlet duct (44), and the structures of the supply duct (87) and the discharge duct (88) are the same as in Embodiment 5.

In this embodiment, however, a portion of the first inlet duct (23) located between the dehumidifying mechanism (60) and the compressor (21) consists of first to fourth sub-portions (81, 82, 83, 84). The first sub-portion (81) is connected at its one end to the moisture absorbing section (62) of the dehumidifying mechanism (60) and connected at the other end to the third four-way selector valve (73). The second sub-portion (82) is connected at its one end to the third four-way selector valve (73) and connected at the other end to the inlet side of the preheater (33). The third sub-portion (83) is connected at its one end to the outlet side of the preheater (33) and connected at the other end to the third four-way selector valve (73). The fourth sub-portion (84) is connected at its one end to the third four-way selector valve (73) and connected at the other end to the compressor (21).

Behavior in Operation

During the cooling operation, the first to third four-way selector valves (71, 72, 73) are switched to the positions as indicated in solid lines in FIG. 9. Thus, the first four-way selector valve (71) and the second four-way selector valve (72) are put into the same conditions as in Embodiment 5. Further, the third four-way selector valve (73) communicates the first sub-portion (81) with the second sub-portion (82) and communicates the third sub-portion (83) with the fourth sub-portion (84). In these conditions, the system operates in the same manner as in Embodiment 3 thereby effecting the cooling operation.

Specifically, in the first channel (20), the first inlet duct (23) takes in an outside air as the primary air through the outside air duct (86). This primary air passes through the dehumidifying mechanism (60), the first sub-portion (81) and the second sub-portion (82), enters the preheater (33), is heated therein, and is then supplied through the third sub-portion (83) and the fourth sub-portion (84) to the compressor (21). Thereafter, the primary air sequentially flows through the first heat exchange section (30a), the preheater (33), the second heat exchange section (30b) and the expander (22) and is supplied to the room through the first outlet duct (24) and the supply duct (87).

On the other hand, in the second channel (40), the second inlet duct (43) takes in a room air as the secondary air through the room air duct (85). This secondary air sequentially flows through the humidifier/cooler (41), the second heat exchange section (30b) and the dehumidifying mechanism (60) and is discharged to outdoors through the second outlet duct (44) and the discharge duct (88).

During the heating operation, the first to third four-way selector valves (71, 72, 73) are switched to the positions as indicated in dash lines in FIG. 9. Thus, the first four-way selector valve (71) and the second four-way selector valve (72) are put into the same conditions as in Embodiment 5. Further, the third four-way selector valve (73) communicates the first sub-portion (81) with the fourth sub-portion (84). Accordingly, the primary air having exited from the dehumidifying mechanism (60) bypasses the preheater (33) and is supplied directly to the compressor (21). Further, no moisture is supplied from the humidifier/cooler (41) and the water introducing section (42) to the secondary air. Therefore, in this embodiment, the system operates in the same manner as in Embodiment 4 thereby effecting the heating operation.

Specifically, in the first channel (20), the first inlet duct (23) takes in a room air as the primary air through the room air duct (85). This primary air sequentially flows through the dehumidifying mechanism (60), the third four-way selector valve (73), the compressor (21), the heat exchanger (30) and the expander (22) and is discharged to outdoors through the first outlet duct (24) and the discharge duct (88).

On the other hand, in the second channel (40), the second inlet duct (43) takes in an outside air as the secondary air through the outside air duct (86). This secondary air sequentially flows through the humidifier/cooler (41), the heat exchanger (30) and the dehumidifying mechanism (60), and is then supplied to the room through the second outlet duct (44) and the supply duct (87).

Modified Example of Embodiment 6

Figure 10:
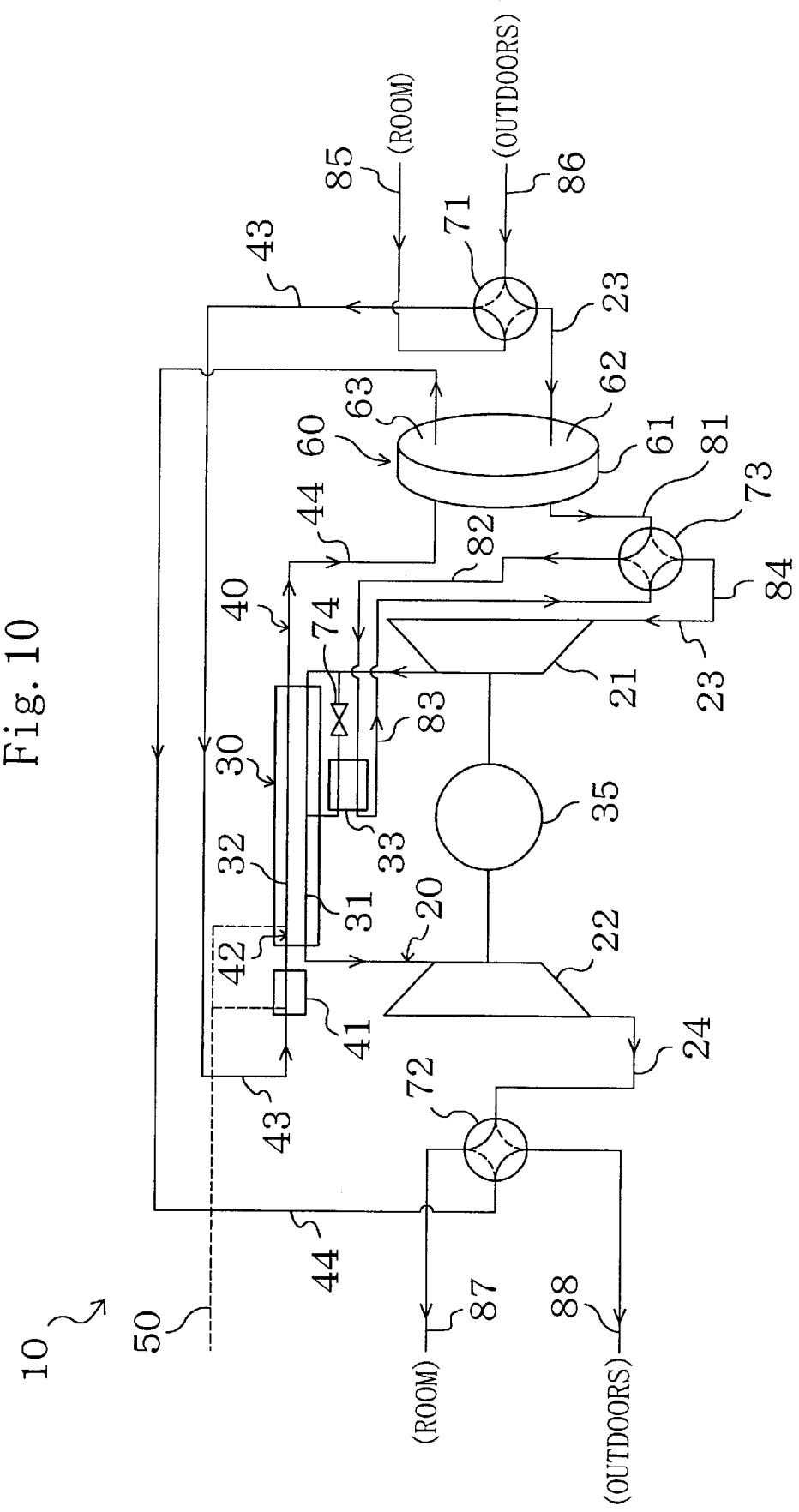
FIG. 10 is a schematic constructional diagram showing the construction of an air conditioning system according to a modified example of Embodiment 6.

As shown in FIG. 10, this modified example is also arranged to accomplish both cooling and heating operations by providing a first four-way selector valve (71) and a second four-way selector valve (72) each as a selector means and a third four-way selector valve (73) as a bypassing means in addition to the construction of the modified example of Embodiment 3 described above. It is to be noted that in this case, an on-off valve (74) is provided in a path which leads part of the primary air coming from the compressor (21) to the preheater (33). The on-off valve (74) is opened during the cooling operation to lead part of the primary air to the preheater (33), while it is closed during the heating operation to lead all of the primary air coming from the compressor (21) to the heat exchanger (30).

OTHER EMBODIMENTS OF THE INVENTION

First Modification

In each of the above embodiments, the dehumidifying mechanism (60) is formed by using the solid adsorbent. The dehumidifying mechanism (60) may be formed by using a liquid absorbent instead. Hereinafter, the dehumidifying mechanism (60) using the liquid absorbent will be described by taking the case of applying it to Embodiment 1 as an example.

Figure 11:
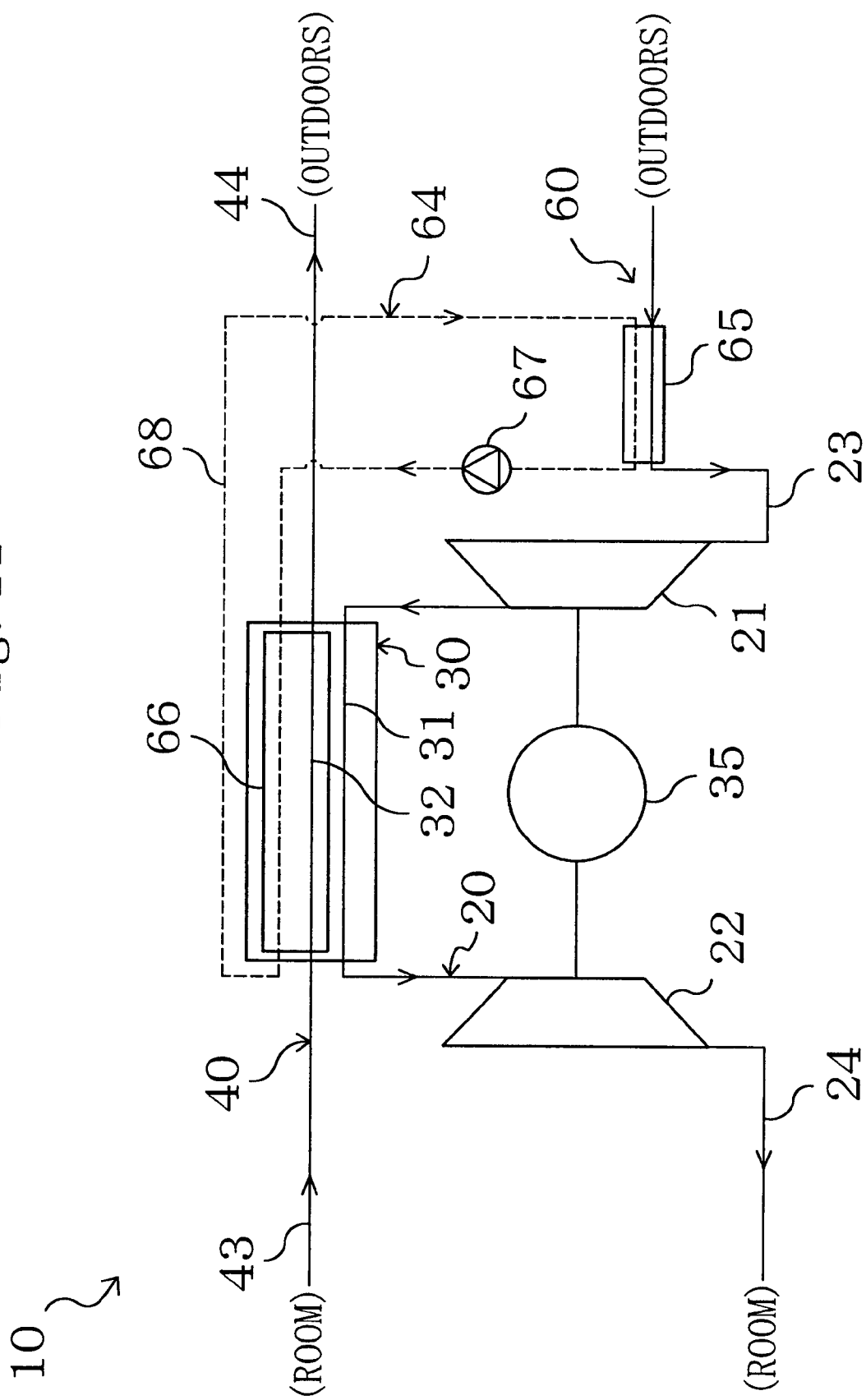
FIG. 11 is a schematic constructional diagram showing the construction of an air conditioning system according to another embodiment.

As shown in FIG. 11, the dehumidifying mechanism (60) of this modification consists of a circulation circuit (64) formed by sequentially connecting a moisture absorbing section (65), a moisture releasing section (66) and a pump (67) through liquid piping (68). The circulation circuit (64) is filled with a water solution of metallic halide as a liquid absorbent. Examples of metallic halide of this kind include LiCl, LiBr and $CaCl_2$. The liquid absorbent may be a water solution of hydrophilic organic compound. Examples of organic compound of this kind include ethylene glycol, glycerin and hydrophilic resin.

The moisture absorbing section (65) is placed partway in the first inlet duct (23). The moisture absorbing section (65) is provided with a hydrophobic porous membrane capable of permeating moisture, and divided into air side and liquid side spaces by the hydrophobic porous membrane. The air side space is communicated with the first inlet duct (23) so that the primary air flows therethrough. The liquid side space is communicated with the liquid piping (68) so that the liquid absorbent flows therethrough. In the moisture absorbing section (65), the primary air in the air side space indirectly contacts the liquid absorbent in the liquid side space through the hydrophobic porous membrane so that moisture contained in the primary air is absorbed in the liquid absorbent after the permeation through the hydrophobic porous membrane. In this manner, the moisture absorbing section (65) effects dehumidification of the primary air.

The moisture releasing section (66) is disposed in the heat exchanger (30). The moisture releasing section (66) is provided with a hydrophobic porous membrane capable of permeating moisture, wherein a liquid side space is formed on one side of the hydrophobic porous membrane and the side of the hydrophobic porous membrane opposite to the liquid side space constitutes the heat absorption side passage (32) of the heat exchanger (30). The liquid side space is communicated with the liquid piping (68) so that the liquid absorbent flows therethrough. In the moisture releasing section (66), the liquid absorbent in the liquid side space is heated up through heat exchange with the secondary air in the heat absorption side passage (32), and at the same time the liquid absorbent in the liquid side space indirectly contacts the secondary air in the heat absorption side passage (32) through the hydrophobic porous membrane so that moisture contained in the liquid absorbent is supplied to the secondary air by the permeation through the hydrophobic porous membrane. In this manner, in the moisture releasing section (66), the liquid absorbent releases moisture to the secondary air.

In the circulation circuit (64), the liquid absorbent circulates by means of the pump (67) so that dehumidification of the primary air is continuously made. Specifically, the liquid absorbent absorbs moisture of the primary air in the moisture absorbing section (65), and flows through the liquid piping (68) into the moisture releasing section (66). In the moisture releasing section (66), the liquid absorbent is heated up and releases moisture to the secondary air. The liquid absorbent is thereby regenerated. The regenerated liquid absorbent flows through the liquid piping (68) into the moisture absorbing section (65). The liquid absorbent repeats this circulation.

Second Modification

In Embodiments 1 to 3, 5 and 6, a cooling operation is effected by taking an outside air as the primary air into the first channel (20) while taking a room air as the secondary air into the second channel (40). In the present invention, however, a cooling operation may be effected in the following manners.

An outside air may be first taken in as the primary air through the first inlet duct (23) of the first channel (20) and supplied to a room through the first outlet duct (24), while another outside air may be taken in as the secondary air through the second inlet duct (43) of the second channel (40) and discharged to outdoors through the second outlet duct (44).

Alternatively, a room air may be taken in as the primary air through the first inlet duct (23) of the first channel (20) and supplied to a room through the first outlet duct (24), while another room air may be taken in as the secondary air through the second inlet duct (43) of the second channel (40) and discharged to outdoors through the second outlet duct (44).

Alternatively, a room air may be taken in as the primary air through the first inlet duct (23) of the first channel (20) and supplied to a room through the first outlet duct (24), while an outside air may be taken in as the secondary air through the second inlet duct (43) of the second channel (40) and discharged to outdoors through the second outlet duct (44).

Alternatively, a mixed air of room and outside airs may be taken in as the primary air through the first inlet duct (23) of the first channel (20) and supplied to a room through the first outlet duct (24), while a room air may be taken in as the secondary air through the second inlet duct (43) of the second channel (40) and discharged to outdoors through the second outlet duct (44).

Alternatively, a mixed air of room and outside airs may be taken in as the primary air through the first inlet duct (23) of the first channel (20) and supplied to a room through the first outlet duct (24), while an outside air may be taken in as the secondary air through the second inlet duct (43) of the second channel (40) and discharged to outdoors through the second outlet duct (44).

Alternatively, a mixed air of room and outside airs may be taken in as the primary air through the first inlet duct (23) of the first channel (20) and supplied to a room through the first outlet duct (24), while another mixed air of room and outside airs may be taken in as the secondary air through the second inlet duct (43) of the second channel (40) and discharged to outdoors through the second outlet duct (44).

Third Modification

In Embodiments 4, 5 and 6, a heating operation is effected by taking a room air as the primary air into the first channel (20) while taking an outside air as the secondary air into the second channel (40). In the present invention, however, a heating operation may be effected in the following manners.

An outside air may be first taken in as the primary air through the first inlet duct (23) of the first channel (20) and discharged to outdoors through the first outlet duct (24), while another outside air may be taken in as the secondary air through the second inlet duct (43) of the second channel (40) and supplied to a room through the second outlet duct (44).

Alternatively, a room air may be taken in as the primary air through the first inlet duct (23) of the first channel (20) and discharged to outdoors through the first outlet duct (24), while another room air may be taken in as the secondary air through the second inlet duct (43) of the second channel (40) and supplied to a room through the second outlet duct (44).

Alternatively, an outside air may be taken in as the primary air through the first inlet duct (23) of the first channel (20) and discharged to outdoors through the first outlet duct (24), while a room air may be taken in as the secondary air through the second inlet duct (43) of the second channel (40) and supplied to a room through the second outlet duct (44).

Alternatively, a room air may be taken in as the primary air through the first inlet duct (23) of the first channel (20) and discharged to outdoors through the first outlet duct (24), while a mixed air of room and outside airs may be taken in as the secondary air through the second inlet duct (43) of the second channel (40) and supplied to a room through the second outlet duct (44).

Alternatively, an outside air may be taken in as the primary air through the first inlet duct (23) of the first channel (20) and discharged to outdoors through the first outlet duct (24), while a mixed air of room and outside airs may be taken in as the secondary air through the second inlet duct (43) of the second channel (40) and supplied to a room through the second outlet duct (44).

Alternatively, a mixed air of room and outside airs may be taken in as the primary air through the first inlet duct (23) of the first channel (20) and discharged to outdoors through the first outlet duct (24), while another mixed air of room and outside airs may be taken in as the secondary air through the second inlet duct (43) of the second channel (40) and supplied to a room through the second outlet duct (44).

INDUSTRIAL APPLICABILITY

As can be seen form the above, the air conditioning system according to the present invention is useful for cooling or heating a room, and particularly suitable for providing air conditioning in an air cycle.

What is claimed is:

1. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air;

wherein the humidity medium of the dehumidifying means (60) comprises a liquid absorbent for absorbing moisture, and the dehumidifying means (60) is arranged so that the liquid absorbent is heated by the primary air coming from the compressor (21) to release moisture having absorbed from the primary air to the secondary air.

2. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air, wherein the heat exchanger (30) is arranged to cool the compressed primary air through heat exchange with the secondary air, and the dehumidifying means (60) is arranged to release moisture in the humidity medium to the secondary air coming from the heat exchanger (30), wherein the humidity medium of the dehumidifying means (60) comprises a liquid absorbent for absorbing moisture, and wherein the dehumidifying means (60) includes a moisture-permeable, hydrophobic porous membrane and is arranged to contact the liquid absorbent with the primary air through the hydrophobic porous membrane.

3. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air, wherein the heat exchanger (30) is arranged to cool the compressed primary air through heat exchange with the secondary air, and the dehumidifying means (60) is arranged to release moisture in the humidity medium to the secondary air coming from the heat exchanger (30), wherein the humidity medium of the dehumidifying means (60) comprises a liquid absorbent for absorbing moisture, and wherein the dehumidifying means (60) comprises a circulation circuit (64) that includes a moisture absorbing section (65) for contacting the liquid absorbent with the primary air and a moisture releasing section (66) for contacting the liquid absorbent with the secondary air and circulates the liquid absorbent between the moisture absorbing section (65) and the moisture releasing section (66).

4. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air, wherein the heat exchanger (30) is arranged to cool the compressed primary air through heat exchange with the secondary air, and the dehumidifying means (60) is arranged to release moisture in the humidity medium to the secondary air coming from the heat exchanger (30), wherein cooling of a room is effected by supplying the primary air expanded in the expander (22) to the room; and preheating means (33) for heating the primary air dehumidified by the dehumidifying means (60) through heat exchange with the primary air compressed by the compressor (21) and then supplying the primary air to the compressor (21).

5. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air, wherein the heat exchanger (30) is arranged to cool the compressed primary air through heat exchange with the secondary air, and the dehumidifying means (60) is arranged to release moisture in the humidity medium to the secondary air coming from the heat exchanger (30), wherein cooling of a room is effected by supplying the primary air expanded in the expander (22) to the room; and preheating means (33) for heating the primary air dehumidified by the dehumidifying means (60) through heat exchange with part of the primary air compressed by the compressor (21) and then supplying the primary air to the compressor (21).

6. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air, wherein the heat exchanger (30) is arranged to cool the compressed primary air through heat exchange with the secondary air, and the dehumidifying means (60) is arranged to release moisture in the humidity medium to the secondary air coming from the heat exchanger (30), wherein cooling of a room is effected by supplying the primary air expanded in the expander (22) to the room; and moisture supplying means (41) for supplying moisture to the secondary air not yet supplied to the heat exchanger (30) in order to humidify and cool the secondary air.

7. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air, wherein the heat exchanger (30) is arranged to cool the compressed primary air through heat exchange with the secondary air, and the dehumidifying means (60) is arranged to release moisture in the humidity medium to the secondary air coming from the heat exchanger (30), wherein cooling of a room is effected by supplying the primary air expanded in the expander (22) to the room; and moisture supplying means (42) for supplying moisture to the secondary air in the heat exchanger (30) in order to use latent heat of evaporation of water to cool the primary air in the heat exchanger (30).

8. The air conditioning system of claim 6 or 7, wherein the moisture supplying means (41, 42) is arranged to supply moisture to the secondary air through a permeable membrane capable of permeating moisture.

9. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air;

wherein the heat exchanger (30) is arranged to cool the compressed primary air through heat exchange with the secondary air, and the dehumidifying means (60) is arranged to release moisture in the humidity medium to the secondary air coming from the heat exchanger (30), and wherein heating of a room is affected by supplying the secondary air heated through heat exchange with the primary air in the heat exchanger (30) to the room.

10. The air conditioning system of claim 9, wherein
the primary air is a room air taken from the room and then discharged to outdoors through the expander (22), while
the secondary air is an outside air taken from outdoors and then supplied to the room through the dehumidifying means (60).

11. The air conditioning system of claim 9, wherein
the primary air is an outside air taken from outdoors and then discharged to outdoors through the expander (22), while
the secondary air is an outside air taken from outdoors and then supplied to the room through the dehumidifying means (60).

12. The air conditioning system of claim 9, wherein
the primary air is a room air taken from the room and then discharged to outdoors through the expander (22), while
the secondary air is a room air taken from the room and then supplied to the room through the dehumidifying means (60).

13. The air conditioning system of claim 9, wherein
the primary air is an outside air taken from outdoors and then discharged to outdoors through the expander (22), while
the secondary air is a room air taken from the room and then supplied to the room through the dehumidifying means (60).

14. The air conditioning system of claim 9, wherein
the primary air is a room air taken from the room and then discharged to outdoors through the expander (22), while
the secondary air is a mixed air of a room air taken from the room and an outside air taken from outdoors and is supplied to the room through the dehumidifying means (60).

15. The air conditioning system of claim 9, wherein
the primary air is an outside air taken from outdoors and then discharged to outdoors through the expander (22), while
the secondary air is a mixed air of a room air taken from the room and an outside air taken from outdoors and is supplied to the room through the dehumidifying means (60).

16. The air conditioning system of claim 9, wherein
the primary air is a mixed air of a room air taken from the room and an outside air taken from outdoors and is discharged to outdoors through the expander (22), while
the secondary air is a mixed air of a room air taken from the room and an outside air taken from outdoors and is supplied to the room through the dehumidifying means (60).

17. An air conditioning system for effecting air conditioning in an air cycle comprising a compressor (21), a heat exchanger (30) and an expander (22), said air conditioning system comprising:

dehumidifying means (60) that includes a humidity medium for absorbing and releasing moisture through contact with an air and allows the humidity medium to absorb moisture in a primary air to be supplied to the compressor (21) while releasing the moisture therein to a secondary air thereby continuously dehumidifying the primary air, wherein the heat exchanger (30) is arranged to cool the compressed primary air through heat exchange with the secondary air, and the dehumidifying means (60) is arranged to release moisture in the humidity medium to the secondary air coming from the heat exchanger (30); and selector means (71, 72) for taking in different airs as the primary and secondary airs for each of cooling and heating operations and selecting the primary air from the expander (22) and the secondary air from the dehumidifying means (60) to supply them to the room to thereby allow both the cooling and heating operations.

18. The air conditioning system of claim 17, comprising
preheating means (33) for heating the primary air dehumidified by the dehumidifying means (60) through heat exchange with the primary air compressed by the compressor (21) and then supplying the primary air to the compressor (21), and
bypassing means (73) for allowing the primary air to bypass the preheating means (33) and to be supplied directly to the compressor (21) during the heating operation.

19. The air conditioning system of claim 17, comprising preheating means (33) for heating the primary air dehumidified by the dehumidifying means (60) through heat exchange with part of the primary air compressed by the compressor (21) and then supplying the primary air to the compressor (21), and bypassing means (73) for allowing the primary air to bypass the preheating means (33) and to be supplied directly to the compressor (21) during the heating operation.

* * * * *

UNITED STATES PATENT AND TRADEMARK OFFICE
CERTIFICATE OF CORRECTION

PATENT NO.    : 6,619,064 B1                                              Page 1 of 1
DATED         : September 16, 2003
INVENTOR(S)   : Chun-cheng Piao et al.

It is certified that error appears in the above-identified patent and that said Letters Patent is hereby corrected as shown below:

<u>Title page,</u>
Item [56], References Cited, FOREIGN PATENT DOCUMENTS, add
-- JP  62-102061  5/1987 --;

Signed and Sealed this

Ninth Day of March, 2004

JON W. DUDAS
*Acting Director of the United States Patent and Trademark Office*